(12) United States Patent  (10) Patent No.: US 9,292,458 B2
Chung et al.  (45) Date of Patent: Mar. 22, 2016

(54) METHOD OF PERFORMING COLLECTIVE COMMUNICATION ACCORDING TO STATUS-BASED DETERMINATION OF A TRANSMISSION ORDER BETWEEN PROCESSING NODES AND COLLECTIVE COMMUNICATION SYSTEM USING THE SAME

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Won-young Chung, Yongin-si (KR); Yong Surk Lee, Seoul (KR); Jong-su Park, Seoul (KR); Ha-young Jeong, Seoul (KR)

(73) Assignees: SAMSUNG ELECTRONICS CO., LTD., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 512 days.

(21) Appl. No.: 13/778,804

(22) Filed: Feb. 27, 2013

(65) Prior Publication Data

US 2014/0156890 A1 Jun. 5, 2014

(30) Foreign Application Priority Data

Dec. 3, 2012 (KR) ........................ 10-2012-0139269

(51) Int. Cl.
*G06F 13/24* (2006.01)
*G06F 13/364* (2006.01)

(52) U.S. Cl.
CPC .................................... *G06F 13/364* (2013.01)

(58) Field of Classification Search
USPC .......... 710/104–110, 260–269; 709/201–203, 709/208–209, 216–225
See application file for complete search history.

(56) References Cited

U.S. PATENT DOCUMENTS 5,822,604 A * 10/1998 Ogasawara ............. G06F 8/453
712/10
6,012,121 A 1/2000 Govindaraju et al.
(Continued)

OTHER PUBLICATIONS

Chung, Won-young et al., "Design of Message Passing Engine Based on Processing Node Status for MPI Collective Communication" The Journal of Korea Information and Communications Society, vol. 37B, No. 8, Aug. 1, 2012, pp. 668-676.
(Continued)

*Primary Examiner* — Raymond Phan
(74) *Attorney, Agent, or Firm* — Sughrue Mion, PLLC

(57) ABSTRACT

A method of performing collective communication in a collective communication system includes processing nodes, including: determining whether a command message, regarding one function among a broadcast function, a scatter function, and a gather function, is generated by a processor; determining a transmission order between the processing nodes by giving transmission priorities to processing nodes that do not communicate, based on a status of each of the processing nodes if it is determined that the command message regarding the one function among the broadcast function, the scatter function, and the gather function, is generated by the processor; and performing communication with respect to the command message based on the determined transmission order.

18 Claims, 25 Drawing Sheets

(56) References Cited

U.S. PATENT DOCUMENTS

| | | | |
|---|---|---|---|
| 6,334,138 B1 * | 12/2001 | Kureya | G06F 15/17368 709/201 |
| 6,336,145 B2 | 1/2002 | Kim | |
| 6,782,537 B1 | 8/2004 | Blackmore et al. | |
| 7,539,989 B2 * | 5/2009 | Blackmore | G06F 9/544 718/100 |
| 7,600,095 B2 * | 10/2009 | Archer | G06F 15/17337 712/28 |
| 7,856,348 B2 | 12/2010 | Supalov | |
| 7,958,513 B2 * | 6/2011 | Jia | G06F 9/546 719/312 |
| 8,108,876 B2 | 1/2012 | Arimilli et al. | |
| 8,161,127 B2 | 4/2012 | Das et al. | |
| 8,161,480 B2 * | 4/2012 | Archer | G06F 9/546 711/147 |
| 8,234,652 B2 | 7/2012 | Arimilli et al. | |
| 8,407,376 B2 * | 3/2013 | Heidelberger | G06F 13/28 710/22 |
| 2006/0248218 A1 | 11/2006 | Kuribayashi | |
| 2009/0064168 A1 | 3/2009 | Arimilli et al. | |
| 2011/0078410 A1 * | 3/2011 | Blackmore | G06F 15/17375 712/30 |
| 2011/0265098 A1 | 10/2011 | Dozsa et al. | |

OTHER PUBLICATIONS

Chung, Won-Young, "Design of Message Passing Engine Based on Processing Node Status for MPI Collective Communication," The Graduate School, Yonsei University, The School of Electrical and Electronic Engineering, Feb. 27, 2012, 123 pages.

* cited by examiner

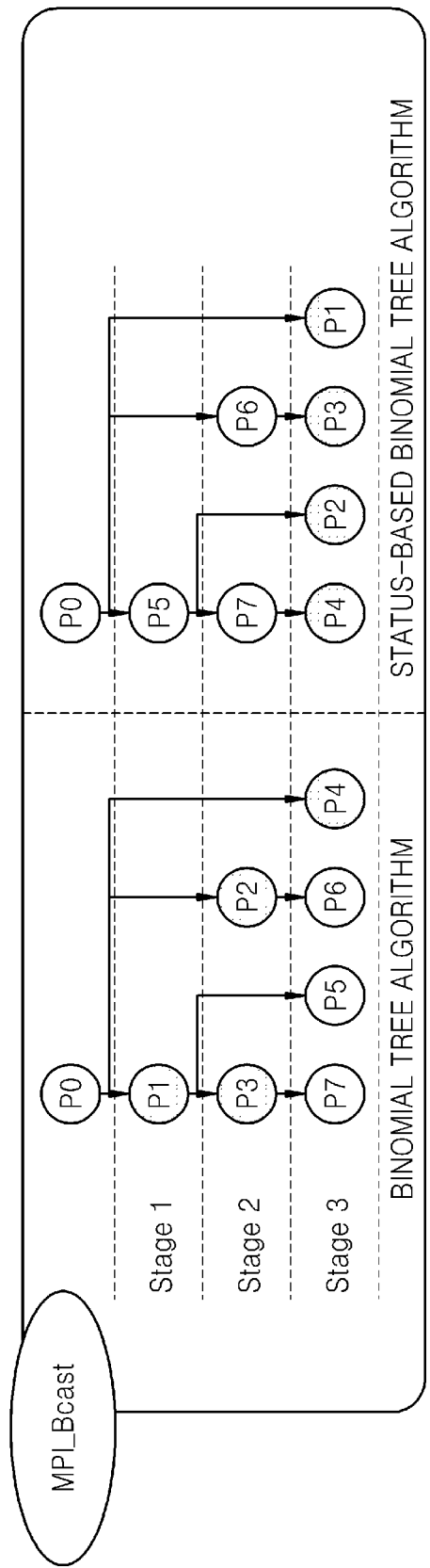

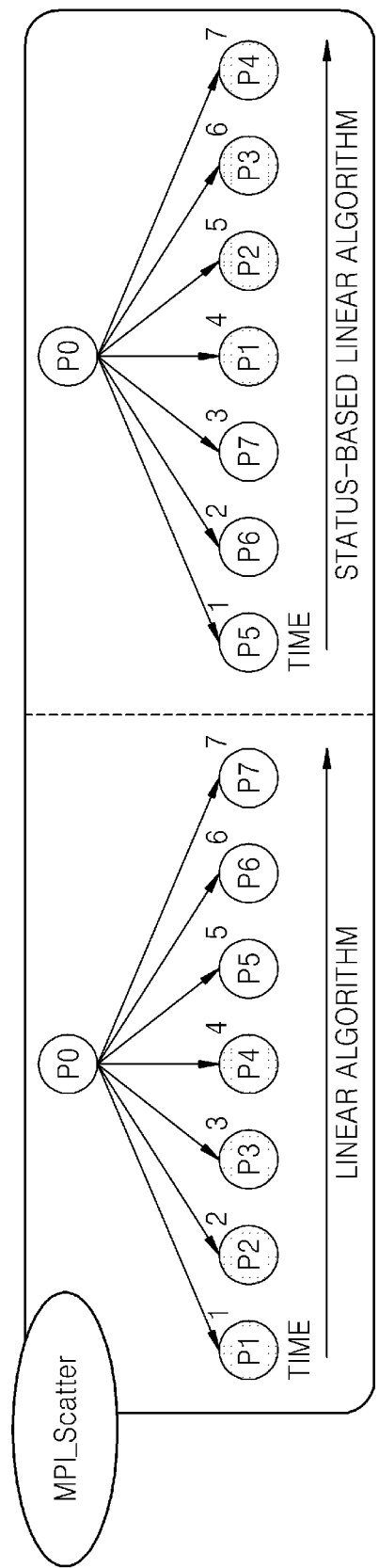

FIG. 8A
FIG. 8B
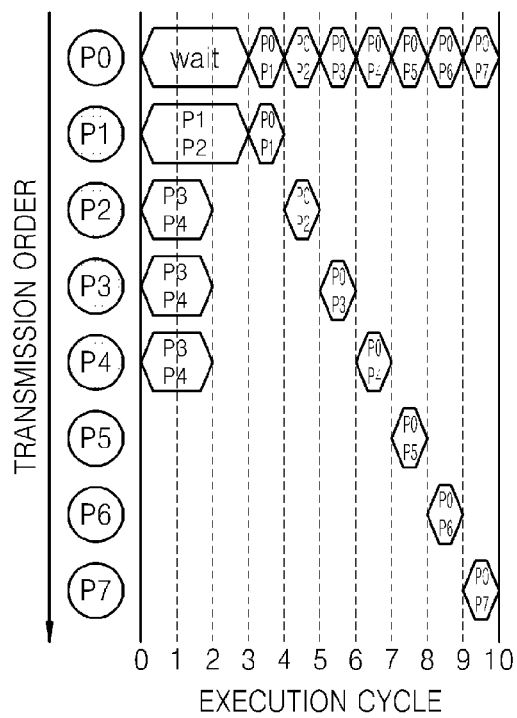
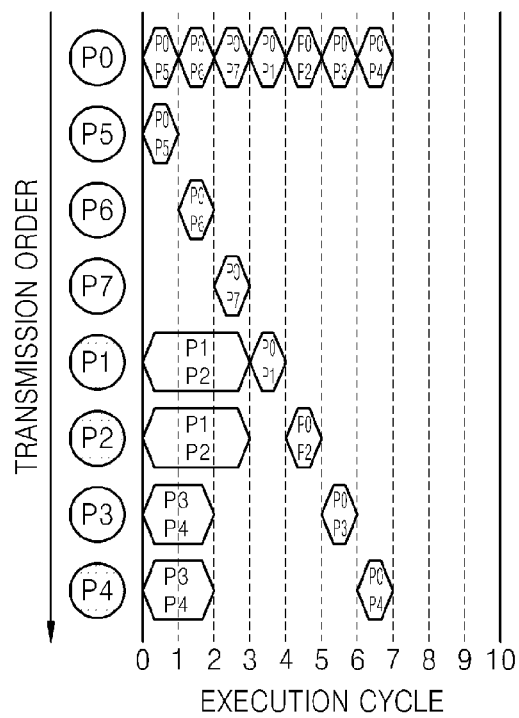

FIG. 12

| | | |
|---|---|---|
| NODE 7 | 23 | 0 |
| | 22 | 0 |
| | 21 | Recv from 3 |
| NODE 6 | 20 | 0 |
| | 19 | 0 |
| | 18 | Recv from 2 |
| NODE 5 | 17 | 0 |
| | 16 | 0 |
| | 15 | Recv from 1 |
| NODE 4 | 14 | 0 |
| | 13 | 0 |
| | 12 | Recv from 0 |
| NODE 3 | 11 | 0 |
| | 10 | Send to 7 |
| | 9 | Recv from 1 |
| NODE 2 | 8 | 0 |
| | 7 | Send to 6 |
| | 6 | Recv from 0 |
| NODE 1 | 5 | Send to 5 |
| | 4 | Send to 3 |
| | 3 | Recv from 0 |
| NODE 0 | 2 | Send to 4 |
| | 1 | Send to 2 |
| | 0 | Send to 1 |

FIG. 16

```
1. // Proposed broadcast algorithm
2. void OCC_MPE::processing_wrapper() {
3. ...
4. else if (tmp_command.bit.messege == command_type.bcast) { // if MPI_Bcast
5. mpe_logic_id.flag = 0;
6. for (i=0;i<N_NODE;i++) { // reset all flag
7. logical_order[i].flag = 0; }
8. if (tmp_command.bit.from_id == my_rank_id) { // if root node
9. bus_state_request->enqueue(1); }
10. bus_state->dequeue(order_tmp.sr_data); // read status register value
11. order_tmp.root = tmp_command.bit.from_id;
12. order_in_queue->enqueue(order_tmp);
13. table_gen( issue_queue, tmp_command ); }
14. ...
15. void OCC_MPE::table_ordering()
16. {
17. int i, fw_number, bk_number;
18. ordering_data order_tmp;
19. while (1) {
20. order_in_queue->dequeue(order_tmp);
21. fw_number = 0;
22. bk_number = N_NODE-1;
23. logical_order[fw_number].logic_id = order_tmp.root;
24. logical_order[fw_number++].flag = 1;
25. if (my_rank_id == order_tmp.root) {
26. mpe_logic_id.logic_id = 0;
27. mpe_logic_id.flag = 1; }
28. for (i=0;i<N_NODE;i++) {
29. if (i != order_tmp.root) {
30. if (order_tmp.sr_data & 0x1<<i) {
31. logical_order[bk_number].logic_id = i;
32. logical_order[bk_number--].flag = 1;
33. if (my_rank_id == i) {
34. mpe_logic_id.logic_id = bk_number+1;
35. mpe_logic_id.flag = 1; } }
36. else {
37. logical_order[fw_number].logic_id = i;
38. logical_order[fw_number++].flag = 1;
39. if (mpsp_id == i) {
40. mpsp_logic_id.logic_id = fw_number-1;
41. mpsp_logic_id.flag = 1; } } }
42. wait(); } } }
43. ...
```

FIG. 17

```
1. // Proposed scatter algorithm
2. void OCC_MPE::processing_wrapper() {
3. ...
4. else if (tmp_command.bit.messege == command_type.scatter) { // scatter
5. if (tmp_command.bit.from_id == my_rank_id) { // if root node
6. bus_state_request->enqueue(0);
7. bus_state->dequeue(mpi_bus_state);
8. tmp_command.bit.messege = command_type.send;
9. for (i = 0; i < N_NODE; i++) { // send to 'free' node
10. if (i != my_rank_id && ((mpi_bus_state&(0x1<<i)) == 0) ) {
11. tmp_command.bit.to_id = i;
12. issue_queue->enqueue(tmp_command.all); }
13. } for (i = 0; i < N_NODE; i++) { // send to 'busy' node
14. if (i != my_rank_id && (mpi_bus_state&(0x1<<i))) {
15. tmp_command.bit.to_id = i;
16. issue_queue->enqueue(tmp_command.all); }
17. }
18. } else { // if leaf nodes
19. tmp_command.bit.to_id = mpsp_id;
20. tmp_command.bit.messege = command_type.receive;
21. issue_queue->enqueue(tmp_command.all); }
22. }
23. ...
```

FIG. 18

```
1. // Proposed gather algorithm
2. void OCC_MPE::processing_wrapper() {
3. ...
4. else if (tmp_command.bit.messege == command_type.gather) { // if command msg. is gather
5. if (tmp_command.bit.to_id == my_rank_id) { // if root node
6. issue_queue -> enqueue(tmp_command.all); }
7. else { // if leaf nodes
8. tmp_command.bit.from_id = my_rank_id;
9. tmp_command.bit.messege = command_type.send;
10. issue_queue -> enqueue(tmp_command.all); }}
11. ...
12. void OCC_MPE::MPU() {
13. ...
14. else if (tmp_msg.bit.messege == command_type.gather) {
15. for (j=0;j<N_NODE;j++) {
16. brs_mask[j] = 0; }
17. brs_mask[my_rank_id] = 1;
18. recv_cmd.all = tmp_msg.all;
19. do {
20. for (k=0; k<N_NODE; k++) {
21. rdy_data = (receive_queue *)&receive_data[k];
22. if (rdy_data->message.all && !brs_mask[k]) {
23. recv_cmd.bit.from_id = k;
24. recv_cmd.bit.messege = messege_type.ready;
25. master_queue -> enqueue(recv_cmd.all); //ready message send
26. wait();
27. dataon_queue -> dequeue(tmp_msg.all); //data on message receive
28. wait();
29. for (j=0;j<tmp_msg.bit.bt_len;j++) { //data message receive
30. dataon_queue -> dequeue(tmp_data);
31. wait();}
32. rdy_data->message.all = 0;
33. tmp_msg.bit.messege = messege_type.complete; //complete message send
34. master_queue -> enqueue(tmp_msg.all); }}
35. for (brs_flag = 1, j=0; j<N_NODE; j++) {
36. brs_flag = brs_flag & brs_mask[j]; }
37. wait(); } while (!brs_flag); }
```

METHOD OF PERFORMING COLLECTIVE COMMUNICATION ACCORDING TO STATUS-BASED DETERMINATION OF A TRANSMISSION ORDER BETWEEN PROCESSING NODES AND COLLECTIVE COMMUNICATION SYSTEM USING THE SAME

CROSS-REFERENCE TO RELATED APPLICATIONS

This application claims the benefit of Korean Patent Application No. 10-2012-0139269, filed on Dec. 3, 2012, in the Korean Intellectual Property Office, the disclosure of which is incorporated herein in its entirety by reference.

BACKGROUND

Exemplary embodiments relate to a communication system and a method of performing communication. More particularly, exemplary embodiments relate to a method of performing collective communication and a collective communication system using the method of performing collective communication.

Collective communication refers to communication including a group of processes. In collective communication, collective communication functions are converted into point-to-point functions so that a point-to-point communication operation, between processing nodes, can be performed. Broadcasting, scattering, or gathering operations are frequently performed in collective communication. A time required for communication when broadcasting, scattering, or gathering operations are performed, needs to be reduced to improve communication performance in collective communication.

SUMMARY

Exemplary embodiments provide a method of performing collective communication, whereby a delay time, caused by a collision when collective communication is performed, may be reduced.

Exemplary embodiments also provide a collective communication system that may reduce a delay time, caused by a collision when collective communication is performed.

According to an aspect of an exemplary embodiment, there is provided a method of performing collective communication in a collective communication system including processing nodes, the method including: determining whether a command message regarding one function among broadcast, scatter, and gather functions, is generated by a processor; determining a transmission order between the processing nodes by giving transmission priorities to processing nodes that do not communicate, based on a status of each of the processing nodes if it is determined that the command message regarding the one function among the broadcast, scatter, and gather functions, is generated by the processor; and performing communication with respect to the command message based on the determined transmission order.

If the command message is generated regarding the broadcast functions, the determining of the transmission order may include determining the transmission order according to a status-based binomial tree algorithm.

The status-based binomial tree algorithm may include: obtaining status information of the processing nodes; changing processing nodes that are located at high-ranking stages of an initially-set binomial tree and that are in communication, to processing nodes that do not communicate, based on the obtained status information; and determining an execution order of point-to-point functions corresponding to the command message regarding the broadcast functions according to the changed processing nodes.

The status information of the processing nodes may be obtained from a status register included in a message passing interface (MPI) bus.

If a command message is generated regarding the scatter functions, the determining of the transmission order may include determining the transmission order according to a status-based linear algorithm, and according to the status-based linear algorithm, a linear execution order of point-to-point functions corresponding to the generated command message may be determined, such that data is first transmitted to processing nodes that do not communicate, from a root processing node based on the status of each processing node.

If the command message is generated regarding the gather functions, the determining of the transmission order may include determining the transmission order according to a mask-based linear algorithm, and according to the mask-based linear algorithm, the transmission order may be determined by giving the transmission order to the processing nodes, such that data is first transmitted to a root processing node from processing nodes that request data transmission, and masking information is written regarding the processing nodes to which the transmission order is given.

The method may further include, if it is determined that the command message is generated regarding collective communication functions except for the broadcast, scatter, and gather functions, determining the transmission order according to point-to-point functions that are converted based on an initially-set MPI library.

According to another aspect of another exemplary embodiment, there is provided a collective communication system including: a message passing interface (MPI) bus including a status register which stores status information of processing nodes and selectively forms a transmission path between the processing nodes according to a transmission order; and a MPI unit, which if a command message regarding one function among broadcast, scatter, and gather functions is received, determines the transmission order between the processing nodes by giving transmission priorities to processing nodes that do not communicate, based on the status information read from the status register.

The MPI bus may form the transmission path having a crossbar structure.

The MPI unit may include: a message processing unit (MPU), which if a command message corresponding to one function among the broadcast or scatter functions is received, determines an execution order of point-to-point functions corresponding to the received command message by giving the transmission priorities to the processing nodes that do not communicate, based on the status information read from the status register; and an issue queue which sequentially stores the point-to-point functions according to the determined execution order.

The MPI unit may further include a memory device which stores information regarding the transmission order according to an initially-set binomial tree, and if the command message is received corresponding to the broadcast functions, the MPU may generate a mapping table, in which information regarding processing nodes that hold high communication ranks and that are in communication is converted to information regarding processing nodes that hold low communication ranks and that do not communicate, in the transmission order according to the initially-set binomial tree based on the status information read from the status register and the MPU may determine the transmission order based on the mapping table.

If the command message is received corresponding to the scatter functions, the MPU may determine a linear execution order of point-to-point functions corresponding to the received command message, such that data is first transmitted to the processing nodes that do not communicate, from a root processing node based on the status information of each processing node.

The MPU may further include a mask register which stores masking information, and if the command message is received corresponding to the gather functions, the MPU may give the transmission order to the processing nodes, such that data is first transmitted to a root processing node from processing nodes that request data transmission, and may write the masking information to the mask register regarding the processing nodes to which the transmission order is given.

The collective communication system may further include a processor which processes functions relating to collective communication, wherein the processor, which if the command message is received regarding collective communication functions except for the broadcast, scatter, and gather functions is received, converts the collective communication functions except for the broadcast, scatter, and gather functions to point-to-point functions according to an initially-set algorithm, and if the one function among the broadcast, scatter, and gather functions is received, the processor transmits the command message regarding the received functions to the MPI unit.

The processor may include a multi-core processor.

According to another aspect of another exemplary embodiment, there is provided a method of performing collective communication in a collective communication system including processing nodes, the method including: determining whether a command message, generated by a processor, corresponds with at least one of broadcast function, scatter functions, and gather functions; applying a status-based binomial tree algorithm to determine a transmission order if the command message corresponds with the broadcast functions; applying a status-based linear algorithm to determine the transmission order if the command message corresponds with the scatter functions; applying a mask-based linear algorithm to determine the transmission order if the command message corresponds with the gather functions; and performing the collective communication based on the determined transmission order.

BRIEF DESCRIPTION OF THE DRAWINGS

Exemplary embodiments will be more clearly understood from the following detailed description taken in conjunction with the accompanying drawings in which:

FIGS. 4A and 4B illustrate a method of determining a transmission order between point-to-point functions with respect to broadcast functions based on a binomial tree algorithm and a status-based binomial tree algorithm;

FIGS. 5A and 5B illustrate a method of determining a transmission order between point-to-point functions with respect to scatter functions based on a linear algorithm and a status-based linear algorithm;

FIG. 8A illustrates an execution cycle of point-to-point functions according to the transmission order determined based on the linear algorithm illustrated in FIG. 5A;

FIG. 8B illustrates an execution cycle of point-to-point functions according to the transmission order determined based on the status-based linear algorithm illustrated in FIG. 5B;

FIG. 12 illustrates point-to-point functions to be executed at processing nodes according to the transmission order determined by the initially-set binomial tree algorithm illustrated in FIG. 11A;

FIG. 16 illustrates a pseudo code regarding a broadcast function processing algorithm;

FIG. 17 illustrates a pseudo code regarding a scatter function processing algorithm;

FIG. 18 illustrates a pseudo code regarding a gather function processing algorithm;

DETAILED DESCRIPTION OF THE EMBODIMENTS

Figure 1:
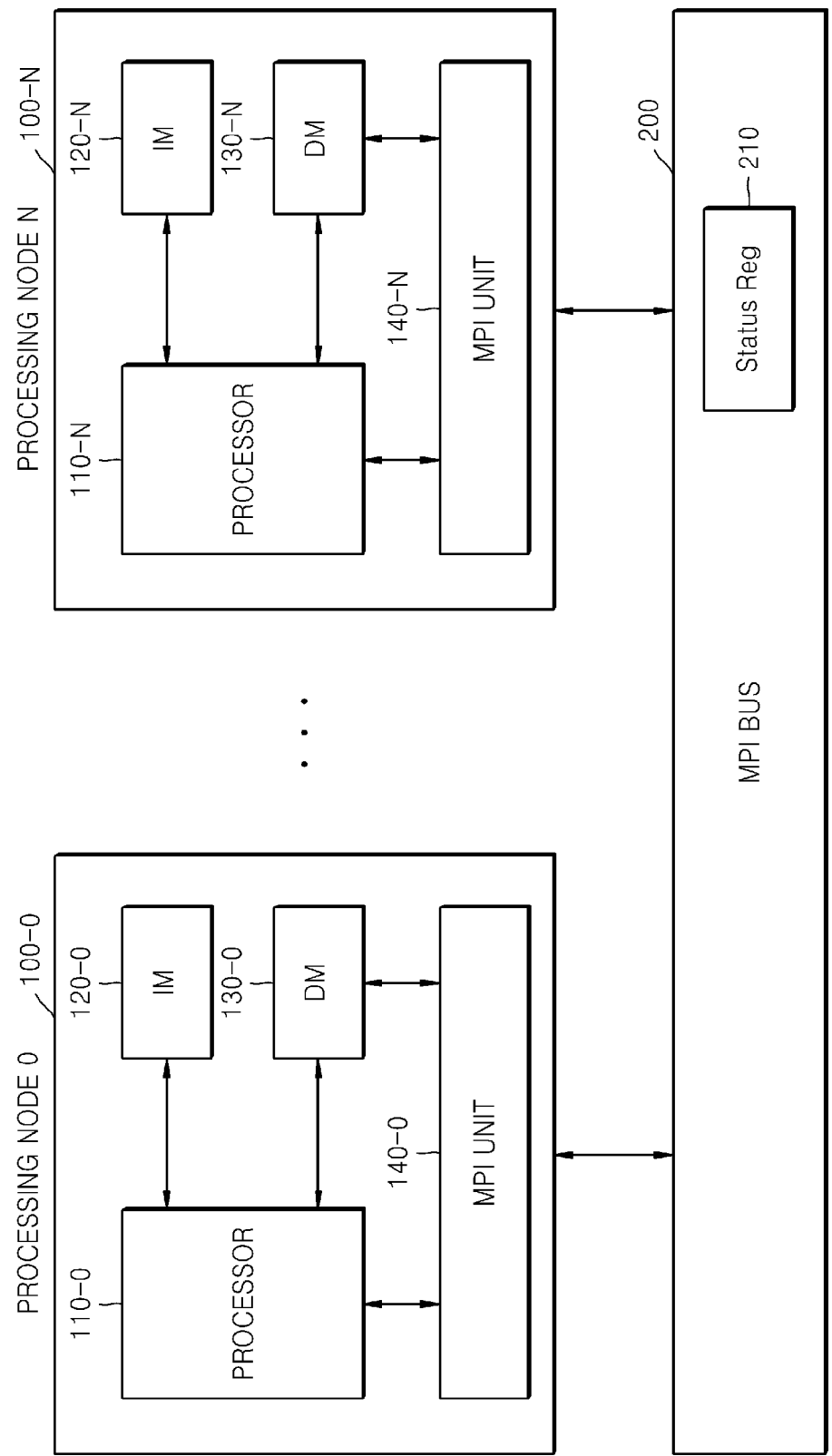
FIG. 1 is a block diagram schematically illustrating a collective communication system according to an embodiment.

As used herein, the term "and/or" includes any and all combinations of one or more of the associated listed items. Expressions such as "at least one of," when preceding a list of elements, modify the entire list of elements and do not modify the individual elements of the list.

Hereinafter, the exemplary embodiments will be described in detail with reference to the attached drawings.

The exemplary embodiments may, however, be embodied in many different forms and should not construed as being limited to those set forth herein. Rather, these embodiments are provided so that this disclosure will be thorough and complete, and will fully convey the exemplary embodiments to those of ordinary skill in the art. Like reference numerals refer to like elements.

Dimensions of structures in the drawings are enlarged or reduced compared to actual dimensions for clarity.

The terms used herein are used to describe embodiments, and not to limit the exemplary embodiments. A singular form may include a plural form, unless otherwise defined. The term "comprise" and/or "comprising" specify the existence of mentioned shapes, numbers, steps, operations, elements, parts, and/or groups thereof, and do not exclude existence or addition of at least one of other shapes, numbers, steps, operations, elements, parts, and/or groups thereof. As used herein, the term "and/or" includes any one of at least one of combinations of one or more of the associated listed items.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram schematically illustrating a collective communication system according to an embodiment.

As illustrated in FIG. 1, the collective communication system according to the present embodiment includes a plurality of processing nodes 100-0 to 100-N, and a message passing interface (MPI) bus 200. Here, N is a natural number that is equal to or greater than 2.

A status register 210 is included in the MPI bus 200, and status information regarding the plurality of processing nodes 100-0 to 100-N connected to the MPI bus 200 are stored in the status register 210. For example, one-bit status information may be allocated to each of the processing nodes 100-0 to 100-N. For example, the MPI bus 200 may write status information, having a first logic value regarding processing nodes that communicate with one another, to the status register 210, and may write status information, having a second logic value regarding processing nodes that do not communicate with one another, to the status register 210. For example, the first logic value may be set to '1', and the second logic value may be set to '0'. Alternatively, the first logic value may be set to '0', and the second logic value may be set to '1'.

Figure 3:
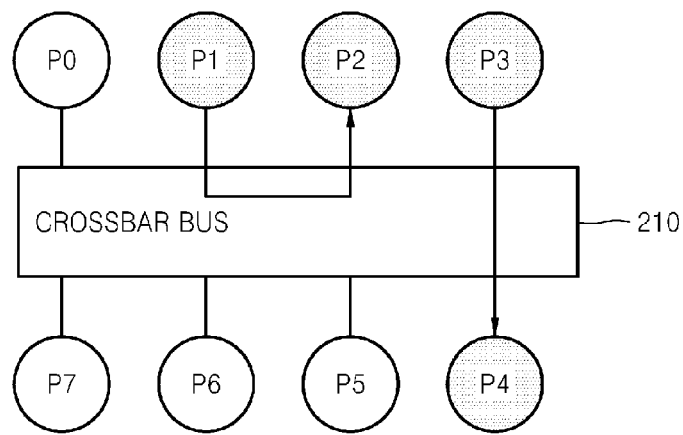
FIG. 3 illustrates a structure of a message passing interface (MPI) bus illustrated in FIG. 1.

As illustrated in FIG. 3, the MPI bus 200 may be designed having a crossbar structure. FIG. 3 illustrates the MPI bus 200 regarding the collective communication system, including eight processing nodes P1 to P7.

The MPI bus 200 connects the processing nodes 100-0 to 100-N to input/output ports, according to point-to-point functions received from the processing nodes 100-0 to 100-N. In other words, the MPI bus 200 forms a transmission path between the processing nodes 100-0 to 100-N, selectively, so as to perform point-to-point communication according to a transmission order determined at the processing nodes 100-0 to 100-N.

For convenience of explanation, a structure of a processing node 0 100-0, among the plurality of processing nodes 100-0 to 100-N, will now be described. Further, it will be understood that other processing nodes 100-1 to 100-N have the same structure as that of the processing node 0 100-0.

The processing node 0 100-0 includes a processor 110-0, an instruction memory (IM) 120-0, a data memory (DM) 130-0, and an MPI unit 140-0.

Instructions for performing point-to-point communication, with respect to collective communication functions by using the collective communication system, are stored in the IM 120-1. Also, an MPI library may be stored in the IM 120-1. For example, program codes for converting messages regarding collective communication functions, except for broadcast, scatter, and gather functions, to point-to-point functions may be included in the MPI library. Program codes for generating a command message regarding one from among broadcast, scatter, and gather functions and for transmitting the command message to the MPI unit 140-0 may be included in the MPI library. In other words, when one among broadcast, scatter, and gather functions are received, program codes for generating a command message regarding the received functions without converting the received functions to point-to-point functions and for transmitting the command message to the MPI unit 140-0 may be included in the MPI library.

Data to be received or transmitted via point-to-point communication, by using the collective communication system, is stored in the DM 130-0.

The processor 110-0 performs an operation of processing the instructions stored in the IM 120-1 and the function relating to collective communication at the processing node 0 100-0 by using the MPI library.

Thus, when a message regarding a collective communication function, except for broadcast, scatter, and gather functions, is received, the processor 110-0 converts the message to point-to-point functions according to an initially-set algorithm. If one among the broadcast, scatter, and gather functions are received, the processor 110-0 generates a command message regarding the received functions to transmit the command message to the MPI unit 140-0.

When a command message regarding the one among the broadcast, scatter, and gather functions is received, the MPI unit 140-0 may determine a transmission order between the processing nodes 100-0 to 100-N by giving transmission priorities to processing nodes that do not communicate with one another, based on the status information read from the status register 210 of the MPI bus 200.

Figure 2:
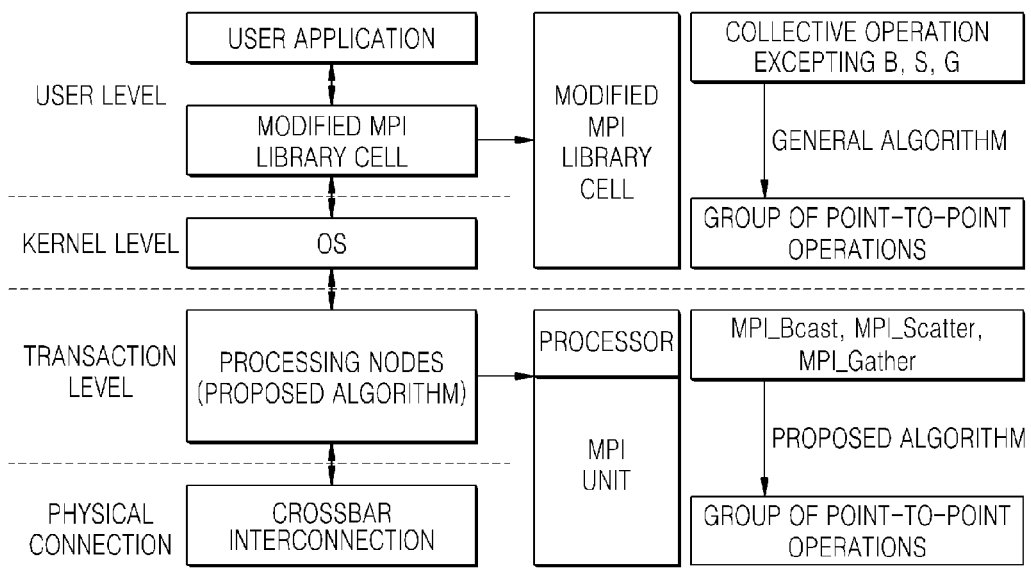
FIG. 2 illustrates an operating system (OS) of the collective communication system illustrated in FIG. 1 based on an algorithm.

FIG. 2 illustrates an operating system (OS) of the collective communication system illustrated in FIG. 1 based on an algorithm.

Referring to FIG. 2, the processor 110-0 does not convert the broadcast, scatter, and gather functions to point-to-point functions at a kernel level by modifying the MPI library cell. The MPI unit 140-0 converts the broadcast, scatter, and gather functions to point-to-point functions at a transaction level, by using a transmission order determined using the algorithm.

When the processor 110-0 generates a command message regarding the broadcast, scatter, and gather functions, an operation of determining a transmission order between processing nodes by using the MPI unit 140-0 will now be described.

An algorithm for determining a transmission order between processing a command message regarding broadcast, scatter, and gather functions will be described with reference to FIGS. 4 through 6.

As illustrated in FIG. 3, for example, it is assumed that a processing node 1 P1 and a processing node 2 P2 are in point-to-point communication, and a processing node 3 P3 and a processing node 4 P4 are in point-to-point communication in the collective communication system including eight processing nodes. Thus, a status of each of the processing nodes 1 to 4 P1 to P4 is "busy", and a status of each of the processing node 0 P0 and the processing nodes 5 to 7 P5 to P7 is "free". It is also assumed that the processing node 0 P0 is set to a root processing node.

FIGS. 4A and 4B illustrate a method of determining a transmission order between point-to-point functions with respect to broadcast functions based on a binomial tree algorithm and a status-based binomial tree algorithm.

Referring to FIG. 4A, data transmission is performed according to an original binominal tree algorithm in the following fixed order.

At stage 1, data transmission from the processing node 0 P0 to the processing node 1 P1 is performed.

At stage 2, data transmission from the processing node 0 P0 to the processing node 2 P2 is performed, and data transmission from the processing node 1 P1 to the processing node 3 P3 is performed.

At stage 3, data transmission from the processing node 0 P0 to the processing node 4 P4 is performed, data transmission from the processing node 1 P1 to the processing node 5 P5 is performed, data transmission from the processing node 2 P2 to the processing node 6 P6 is performed, and data transmission from the processing node 3 P3 to the processing node 7 P7 is performed.

As described above, since the processing nodes 1 P1, 2 P2, and 3 P3 located at stages 1 and 2 are high-ranking stages in communication, point-to-point communication should stand by until communication in progress is terminated.

Referring to FIG. 4B, processing nodes that are located at high-ranking stages of an initially-set binomial tree and that are in communication, are converted to processing nodes that do not communicate with one another, according to a status-based binomial tree algorithm proposed. For example, the processing nodes 1 P1, 2 P2, and 3 P3 that are located at high-ranking stages of an original binomial tree and that have a "busy" status are converted to the processing nodes 5 P5, 6 P6, and 7 P7 having a "free" status.

Thus, according to the status-based binomial tree algorithm, data transmission is performed in the following adaptively-changed order.

At stage 1, data transmission from the processing node 0 P0 to the processing node 5 P5 is performed.

At stage 2, data transmission from the processing node 0 P0 to the processing node 6 P6 is performed, and data transmission from the processing node 5 P5 to the processing node 7 P7 is performed.

At stage 3, data transmission from the processing node 0 P0 to the processing node 1 P1 is performed, data transmission from the processing node 5 P5 to the processing node 2 P2 is performed, data transmission from the processing node 6 P6 to the processing node 3 P3 is performed, and data transmission from the processing node 7 P7 to the processing node 4 P4 is performed.

As described above, since the processing nodes 5 P5, 6 P6, and 7 P7 that are located at stages 1 and 2 are high-ranking stages that have a "free" status, communication may be performed without standing by.

Figure 7A:
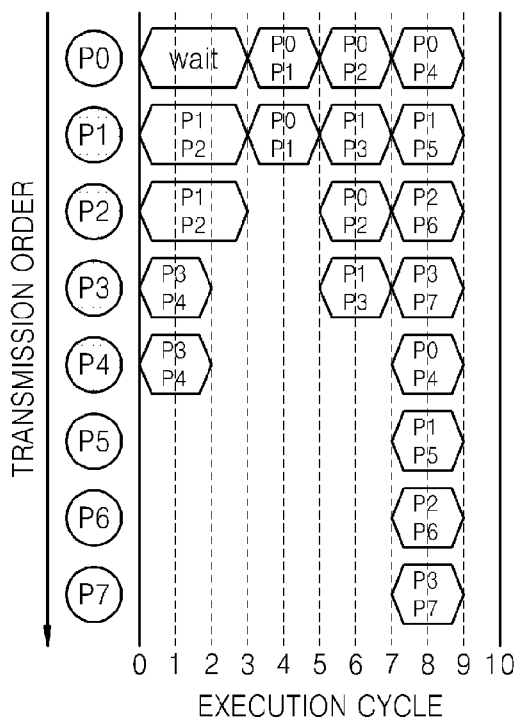
FIG. 7A illustrates an execution cycle of point-to-point functions according to the transmission order determined based on the binomial tree algorithm illustrated in FIG. 4A.
Figure 7B:
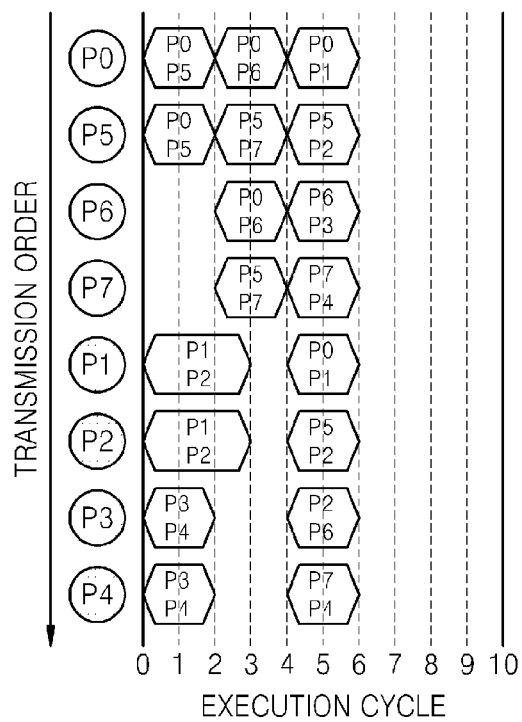
FIG. 7B illustrates an execution cycle of point-to-point functions according to the transmission order determined based on the status-based binomial tree algorithm illustrated in FIG. 4B.

FIG. 7A illustrates an execution cycle of point-to-point functions according to the transmission order determined based on the binomial tree algorithm illustrated in FIG. 4A. FIG. 7B illustrates an execution cycle of point-to-point functions according to the transmission order determined based on the status-based binomial tree algorithm illustrated in FIG. 4B.

Referring to FIG. 7A to which the binomial tree algorithm is applied, since the processing node 1 P1 located at stage 1 is in communication with the processing node 2 P2, point-to-point communication between the processing node 0 P0 and the processing node 1 P1 to be performed at stage 1 should stand by until communication is terminated at the processing node 1 P1. FIG. 7A illustrates that point-to-point communication has a standby status during three cycles until communication is terminated at the processing node 1 P1. Thus, a time corresponding to a total of nine cycles is required to perform collective communication regarding broadcast functions.

Referring to FIG. 7B to which the status-based binomial tree algorithm of the exemplary embodiments is applied, processing nodes that have a "free" status are allocated to stages 1 and 2, that are high-ranking stages, so that point-to-point communication may be immediately performed in the order of stages 1, 2, and 3 determined based on the status-based binomial tree algorithm without a standby time. Thus, a time corresponding to a total of six cycles is required to perform collective communication regarding broadcast functions.

Thus, referring to FIGS. 7A and 7B, by applying the status-based binomial tree algorithm, time required for collective communication regarding broadcast functions may be reduced by three cycles compared to a case where the original binomial tree algorithm is applied.

Next, FIGS. 5A and 5B illustrate a method of determining a transmission order between point-to-point functions with respect to scatter functions based on a linear algorithm and a status-based linear algorithm.

Referring to FIG. 5A, data transmission is performed in the initially-set order according to an original linear algorithm.

First, data transmission from the processing node 0 P0 to the processing node 1 P1 is performed. Second, after data transmission is performed by first point-to-point communication, data transmission from the processing node 0 P0 to the processing node 2 P2 is performed. Third, after data transmission is performed by second point-to-point communication, data transmission from the processing node 0 P0 to the processing node 3 P3 is performed. Fourth, after data transmission is performed by third point-to-point communication, data transmission from the processing node 0 P0 to the processing node 4 P4 is performed. Fifth, after data transmission is performed by fourth point-to-point communication, data transmission from the processing node 0 P0 to the processing node 5 P5 is performed. Sixth, after data transmission is performed by fifth point-to-point communication, data transmission from the processing node 0 P0 to the processing node 6 P6 is performed. Seventh, after data transmission is performed by sixth point-to-point communication, data transmission from the processing node 0 P0 to the processing node 7 P7 is performed.

As described above, since the processing nodes 1 P1, 2 P2, 3 P3, and 4 P4 that hold high communication ranks are in communication, point-to-point communication should stand by until communication in progress is terminated. In other words, since the processing node 1 P1 designated in a first point-to-point transmission order is in communication, point-to-point communication should be maintained having a standby status until communication is terminated at the processing node 1 P1.

Referring to FIG. 5B, the transmission order is adaptively changed so that high communication ranks are designed for processing nodes that do not communicate with one another based on the status-based linear algorithm.

First, data transmission from the processing node 0 P0 to the processing node 5 P5 is performed. Second, after data transmission is performed by first point-to-point communication, data transmission from the processing node 0 P0 to the processing node 6 P6 is performed. Third, after data transmission is performed by second point-to-point communication, data transmission from the processing node 0 P0 to the processing node 7 P7 is performed. Fourth, after data transmission is performed by third point-to-point communication, data transmission from the processing node 0 P0 to the processing node 1 P1 is performed. Fifth, after data transmission is performed by fourth point-to-point communication, data transmission from the processing node 0 P0 to the processing node 2 P2 is performed. Sixth, after data transmission is performed by fifth point-to-point communication, data transmission from the processing node 0 P0 to the processing node 3 P3 is performed. Seventh, after data transmission is performed by sixth point-to-point communication, data transmission from the processing node 0 P0 to the processing node 4 P4 is performed.

As described above, since the processing nodes 5 P5, 6 P6, and 7 P7 that hold high communication ranks have a "free" status, communication may be performed immediately without standing by.

FIG. 8A illustrates an execution cycle of point-to-point functions according to the transmission order determined based on the linear algorithm illustrated in FIG. 5A. FIG. 8B illustrates an execution cycle of point-to-point functions according to the transmission order determined based on the status-based linear algorithm illustrated in FIG. 5B.

Referring to FIG. 8A to which the linear algorithm is applied, since the processing node 1 P1 that holds a first communication rank is in communication with the processing node 2 P2, point-to-point communication between the processing node 0 P0 and the processing node 1 P1 to be performed at stage 1 should stand by until communication is terminated at the processing node 1 P1. FIG. 8A illustrates the case where point-to-point communication has a standby status during three cycles, until communication is terminated at the processing node 1 P1. Thus, a time corresponding to a total of ten cycles is required to perform collective communication regarding scatter functions.

Referring to FIG. 8B to which the status-based linear algorithm is applied, processing nodes that have a "free" status are allocated to high communication ranks so that point-to-point communication may be immediately performed in the transmission order determined based on the status-based linear algorithm, without standing by. Thus, a time corresponding to a total of seven cycles is required to perform collective communication regarding scatter functions.

Thus, referring to FIGS. 8A and 8B, by applying the status-based linear algorithm of the exemplary embodiments, the time required for collective communication regarding scatter functions may be reduced by three cycles compared to the case where the original linear algorithm is applied.

Figures 6A, 6B:
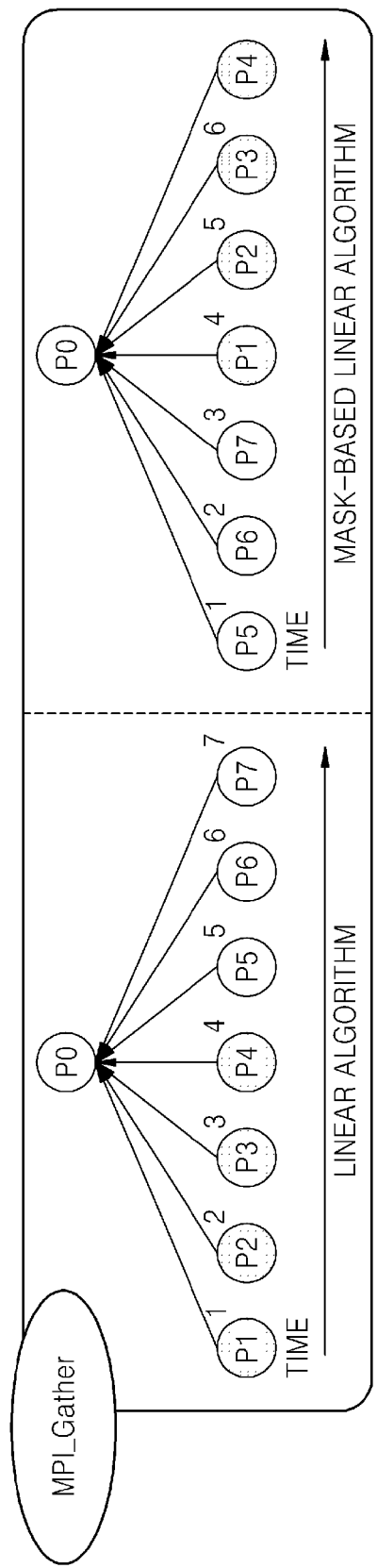
FIGS. 6A and 6B illustrate a method of determining a transmission order between point-to-point functions with respect to gather functions based on the linear algorithm and a mask-based linear algorithm.

Next, FIGS. 6A and 6B illustrate a method of determining a transmission order between point-to-point functions with respect to gather functions based on the linear algorithm and a mask-based linear algorithm.

Referring to FIG. 6A, according to the linear algorithm, data transmission is performed in the initially-set order as below.

First, data transmission from the processing node 1 P1 to the processing node 0 P0 is performed. Second, after data transmission is performed by first point-to-point communication, data transmission from the processing node 2 P2 to the processing node 0 P0 is performed. Third, after data transmission is performed by second point-to-point communication, data transmission from the processing node 3 P3 to the processing node 0 P0 is performed. Fourth, after data transmission is performed by third point-to-point communication, data transmission from the processing node 4 P4 to the processing node 0 P0 is performed. Fifth, after data transmission is performed by fourth point-to-point communication, data transmission from the processing node 5 P5 to the processing node 0 P0 is performed. Sixth, after data transmission is performed by fifth point-to-point communication, data transmission from the processing node 6 P6 to the processing node 0 P0 is performed. Seventh, after data transmission is performed by sixth point-to-point communication, data transmission from the processing node 7 P7 to the processing node 0 P0 is performed.

As described above, since the processing nodes 1 P1, 2 P2, 3 P3, and 4 P4 that hold high communication ranks are in communication, the processing nodes 2 P2, 3 P3, and 4 P4 should stand by until communication in progress is terminated. In other words, since the processing node 1 P1 designated in a first point-to-point transmission order is in communication, point-to-point communication should have a standby status until communication is terminated at the processing node 1 P1.

Referring to FIG. 6B, according to the mask-based linear algorithm of the exemplary embodiments, a transmission order is adaptively changed so that high communication ranks may be designated to processing nodes that do not communicate with one another. In other words, the transmission order is first given to a root processing node among processing nodes that require data transmission so as to transmit data, and masking information is written to the root processing node to which the transmission order is given. It may be determined whether communication of point-to-point functions with respect to gather functions is completed, by using the masking information.

First, if the processing node 5 P5 requires data transmission, data transmission from the processing node 5 P5 to the processing node 0 P0 is performed. Second, after data transmission is performed by first point-to-point communication, if the processing node 6 P6 requires data transmission, data transmission from the processing node 6 P6 to the processing node 0 P0 is performed. Third, after data transmission is performed by second point-to-point communication, if the processing node 7 P7 requires data transmission, data transmission from the processing node 7 P7 to the processing node 0 P0 is performed. Fourth, after data transmission is performed by third point-to-point communication, if the processing node 1 P1 requires data transmission, data transmission from the processing node 1 P1 to the processing node 0 P0 is performed. Fifth, after data transmission is performed by fourth point-to-point communication, if the processing node 2 P2 requires data transmission, data transmission from the processing node 2 P2 to the processing node 0 P0 is performed. Sixth, after data transmission is performed by fifth point-to-point communication, if the processing node 3 P3 requires data transmission, data transmission from the processing node 3 P3 to the processing node 0 P0 is performed. Seventh, after data transmission is performed by sixth point-to-point communication, if the processing node P4 requires data transmission, data transmission from the processing node 4 P4 to the processing node 0 P0 is performed.

As described above, since the processing nodes 5 P5, 6 P6, and 7 P7 that hold high communication ranks have a "free" status, communication may be performed immediately without standing by.

Figure 9A:
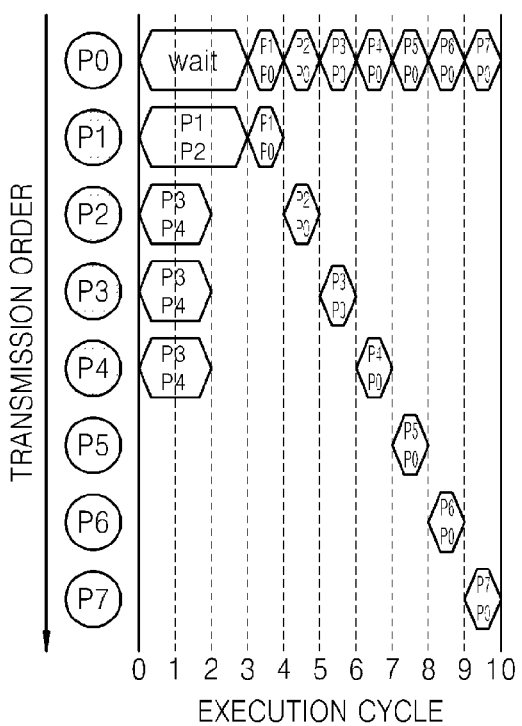
FIG. 9A illustrates an execution cycle of point-to-point functions according to the transmission order determined based on the linear algorithm illustrated in FIG. 6A.
Figure 9B:
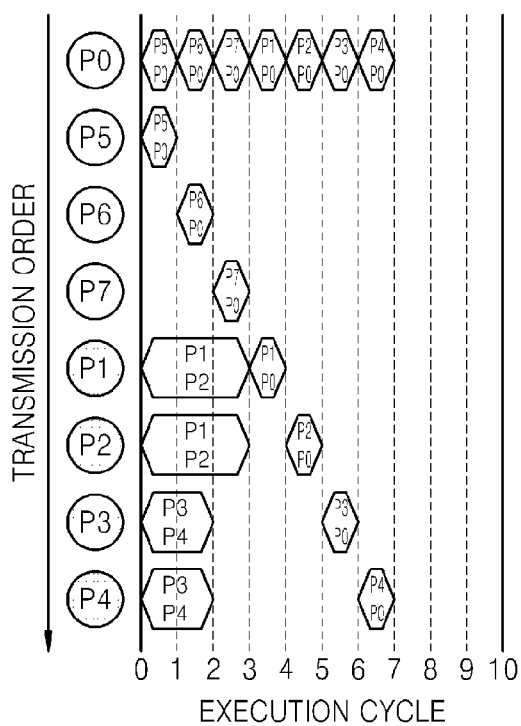
FIG. 9B illustrates an execution cycle of point-to-point functions according to the transmission order determined based on the mask-based linear algorithm illustrated in FIG. 6B.

FIG. 9A illustrates an execution cycle of point-to-point functions according to the transmission order determined based on the linear algorithm illustrated in FIG. 6A. FIG. 9B illustrates an execution cycle of point-to-point functions according to the transmission order determined based on the mask-based linear algorithm illustrated in FIG. 6B.

Referring to FIG. 9A to which the linear algorithm is applied, since the processing node 1 P1 that holds a first communication rank is in communication with the processing node 2 P2, point-to-point communication between the processing node 1 P1 and the processing node 0 P0 to be performed in a first transmission order should stand by until communication is terminated at the processing node 1 P1. FIG. 9A illustrates the case where point-to-point communication has a standby status during three cycles, until communication is terminated at the processing node 1 P1. Thus, a time corresponding to a total of ten cycles is required to perform collective communication with respect to gather functions.

Referring to FIG. 9B to which the mask-based linear algorithm is applied, processing nodes that have a "free" status are allocated to high communication ranks so that point-to-point communication may be performed in the transmission order determined based on the mask-based linear algorithm, without a standby time. Thus, a time corresponding to a total of seven cycles is required to perform collective communication with respect to gather functions.

Thus, referring to FIGS. 9A and 9B, by applying the mask-based linear algorithm, time required for collective communication with respect to gather functions may be reduced by three cycles compared to the case where the original linear algorithm is applied.

Figure 10:
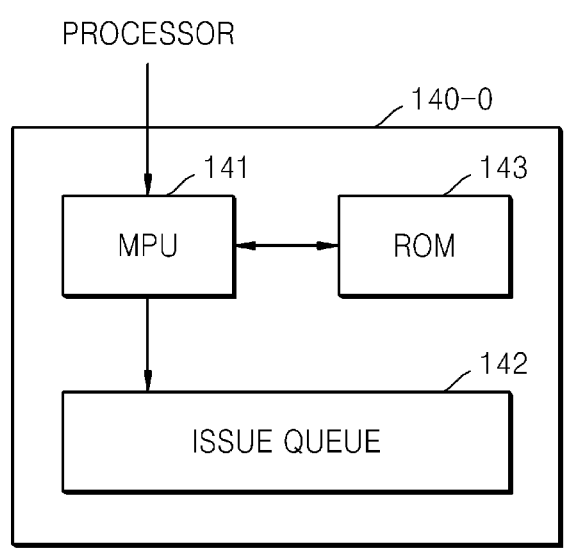
FIG. 10 is a block diagram illustrating a main structure of an MPI unit illustrated in FIG. 1.

FIG. 10 is a block diagram illustrating a main structure of the MPI unit 140-0 illustrated in FIG. 1.

As illustrated in FIG. 10, the MPI unit 140-0 includes a message processing unit (MPU) 141, an issue queue 142, and a memory unit 143.

For example, the memory unit 143 may be a read only memory (ROM), which is nonvolatile memory. Information regarding a transmission order based on the initially-set binomial tree algorithm is stored in the memory unit 143.

Figure 11A:
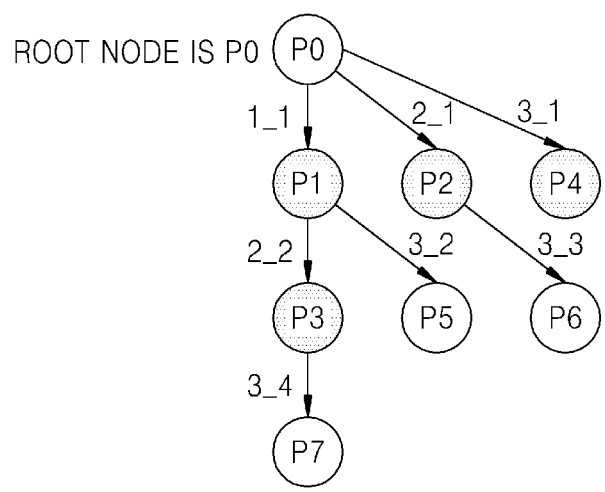
FIG. 11A illustrates a transmission order based on an initially-set binomial tree algorithm.

For example, in a collective communication system including eight processing nodes, the information regarding the transmission order, based on the initially-set binomial tree algorithm illustrated in FIG. 11A, may be stored in the memory unit 143. In other words, point-to-point functions allocated to each processing node according to a transmission order determined based on the initially-set binomial tree algorithm may be stored in the memory unit 143. For example, point-to-point functions allocated to each processing node according to a transmission order illustrated in FIG. 12 may be stored in the memory unit 143.

When a command message corresponding to one among broadcast and scatter functions is received from the processor 110-0, the MPU 141 may give transmission priorities to processing nodes that do not communicate, based on status information read from the status register 210 of the MPI bus 200 to determine an execution order of point-to-point functions corresponding to the command message received from the processor 110-0.

The point-to-point functions corresponding to the command message are sequentially stored in the issue queue 142 according to the execution order determined by the MPU 141.

The MPI unit 140-0 may transmit or receive a message or data for communication that corresponds to the point-to-point functions to or from the MPI bus 200 in an order stored in the issue queue 142. In other words, point-to-point communication is performed on the point-to-point functions in the order stored in the issue queue 142.

An operation of determining a transmission order for processing a command message regarding broadcast, scatter, and gather functions, by using the collective communication system of FIG. 1, will be described with reference to FIGS. 11 through 15.

Figure 11B:
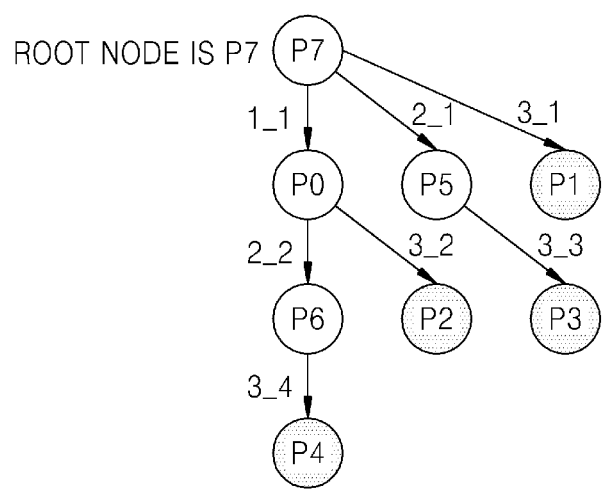
FIG. 11B illustrates an example in which the transmission order is changed by the status-based binomial tree algorithm, according to an embodiment.

FIG. 11A illustrates a transmission order based on an initially-set binomial tree algorithm. FIG. 11B illustrates an example in which the transmission order is changed by the status-based binomial tree algorithm, according to an embodiment.

FIG. 11A illustrates an example in which a root processing node is set to P0. FIG. 11B illustrates an example in which the root processing node is set to P7.

FIG. 12 illustrates point-to-point functions to be executed at processing nodes, according to the transmission order determined by the initially-set binomial tree algorithm illustrated in FIG. 11A.

An operation of processing a command message, regarding broadcast functions by using the collective communication system of FIG. 1, will be described with reference to FIGS. 13A and 13B.

Figure 13A:
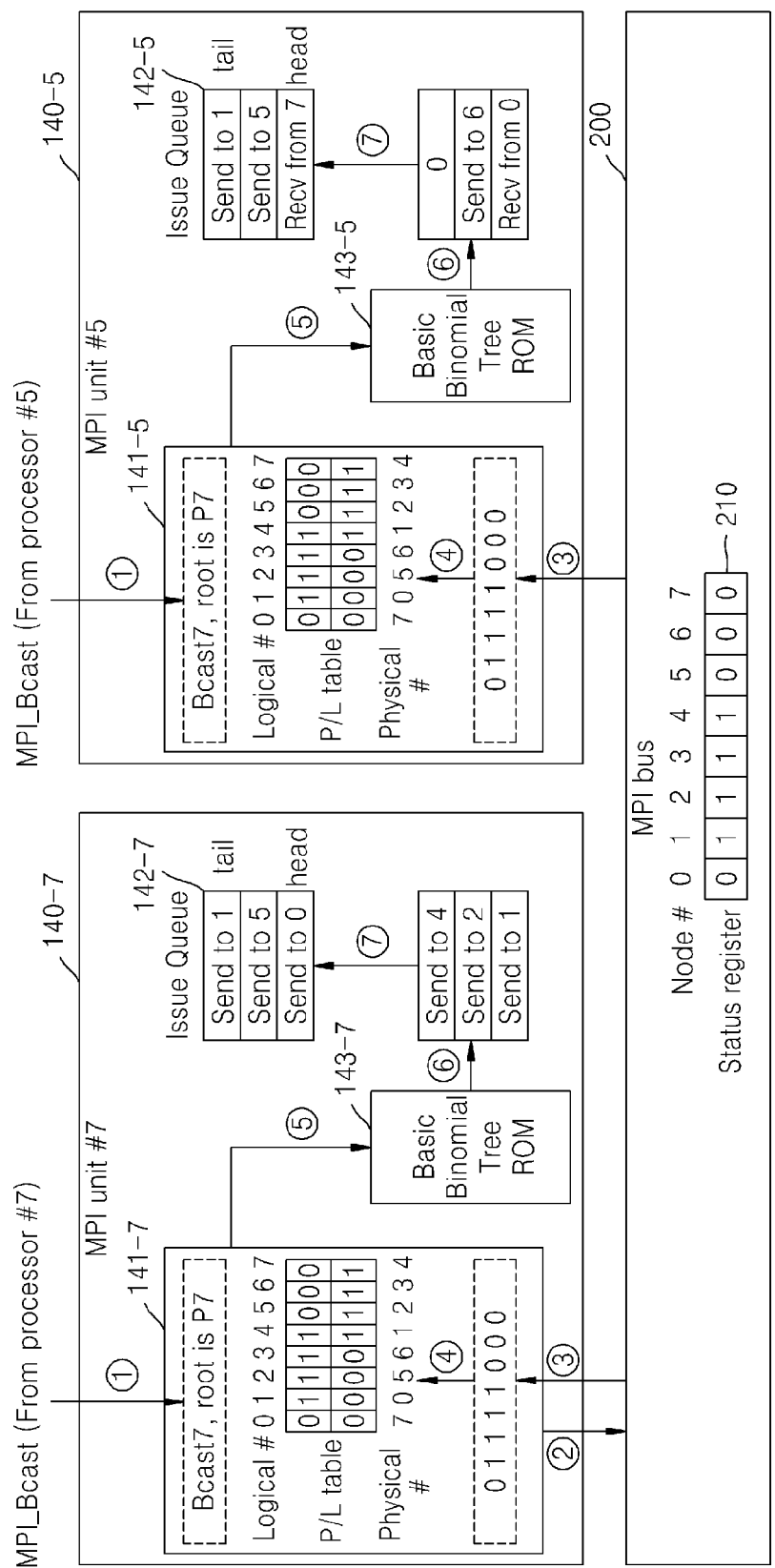
FIG. 13A illustrates an operation of processing a command message regarding broadcast functions by using the collective communication system illustrated in FIG. 1.
Figure 13B:
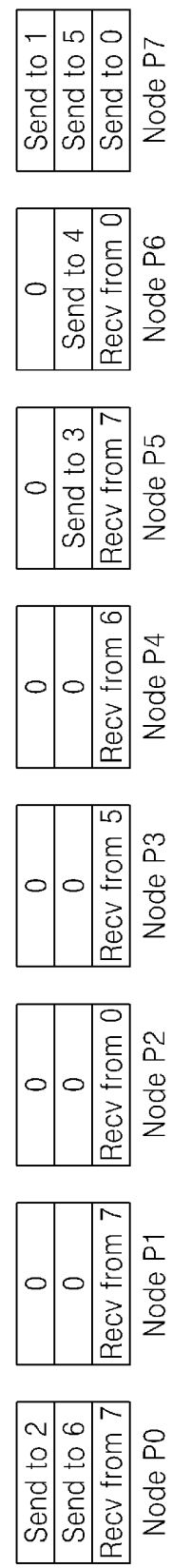
FIG. 13B illustrates point-to-point functions stored in an issue queue of processing nodes after the command message regarding broadcast functions is processed by using the collective communication system illustrated in FIG. 1.

FIG. 13A illustrates an operation of processing a command message regarding broadcast functions, for example, a root processing node 7 P7 and a processing node 5 P5, among a plurality of processing nodes P0 to P7, by using the collective communication system illustrated in FIG. 1.

Information regarding the transmission order, according to the initially-set binomial tree algorithm illustrated in FIG. 11A, is stored in a ROM 143-7 included in an MPI unit 140-7 of the processing node 7 P7 and in a ROM 143-5 included in an MPI unit 140-5 of the processing node 5 P5.

If the MPI units 140-7 and 140-5 each receives a command message MPI_Bcast regarding broadcast functions from processors of the processing node 7 P7 and the processing node 5 P5 (①), the MPU 141-7 of a root processing node 7 P7 requests the MPI bus 200 for status information of the plurality of processing nodes P0 to P7 (②).

The MPI bus 200 reads the status information stored in the status register 210 and transmits the read status information to the processing nodes P0 to P7 (③). The status information may be stored in the status register 210 by allocating one bit to each of the processing nodes P0 to P7. For example, in FIG.

13A, a processing node having a 'busy' status is marked by '1', and a processing node having a 'free' status is marked by '0'.

The MPU 141-7 of the root processing node 7 P7 and the MPU 141-5 of the processing node 5 each generates a mapping table, in which information regarding processing nodes that hold high communication ranks and that are in communication is converted to information regarding processing nodes that hold low communication ranks and that do not communicate, in a transmission order according to an initially-set binomial tree based on the status information received from the MPI bus 200 (④).

According to the status information received from the MPI bus 200, the processing nodes 0, 5, 6, and 7 represent a 'free' status, and the processing nodes 1, 2, 3, and 4 represent a 'busy' status. Logical numbers in the mapping table represent numbers of the processing nodes in an initially-set transmission order, and physical numbers in the mapping table represent the number of processing nodes having a 'free' status to which transmission priorities are given. For example, the root processing node 7 P7 that indicates the 'free' status among the processing nodes may be first arranged as physical numbers in the mapping table. Thus, the logical numbers in the mapping table may be arranged in the order of 0, 1, 2, 3, 4, 5, 6, and 7, and the physical numbers in the mapping table may be arranged in the order of 7, 0, 5, 6, 1, 2, 3, and 4.

The MPU 141-7 and the MPU 141-5 read point-to-point functions that are allocated to processing nodes having logical numbers corresponding to physical numbers from the ROM 143-7 and the ROM 143-5 by using the mapping table (⑤, ⑥).

Referring to the mapping table, a logical number 0 is mapped to a physical number 7. Thus, the MPU 141-7 of the processing node 7 reads point-to-point functions allocated to the processing node 0 from the ROM 143-7. Referring to FIG. 12, the point-to-point functions allocated to the processing node 0 are 'Send to 1', 'Send to 2', and 'Send to 4'.

In the same manner, referring to the mapping table, a logical number 2 is mapped to a physical number 5. Thus, the MPU 141-5 of the processing node 5 reads the point-to-point functions allocated to the processing node 2 from the ROM 143-5. Referring to FIG. 12, the point-to-point functions allocated to the processing node 2 are 'Recv from 0' and 'Send to 6'.

The MPU 141-7 and the MPU 141-5 convert the logical numbers of the point-to-point functions, which are respectively read from the ROM 143-7 and the ROM 143-5, to physical numbers by using the mapping table, and store the physical numbers in an issue queue 142-7 and an issue queue 142-5, respectively (⑦).

Referring to the mapping table, a physical number 0 is mapped to a logical number 1, a physical number 5 is mapped to a logical number 2, and a physical number 1 is mapped to a logical number 4. Thus, 'Send to 1' is converted to 'Send to 0', 'Send to 2' is converted to 'Send to 5', and 'Send to 4' is converted to 'Send to 1'.

Thus, 'Send to 0', 'Send to 5', and 'Send to 1' are sequentially stored in the issue queue 142-7 of the processing node 7 P7.

In the same manner, a physical number 7 is mapped to a logical number 0, and a physical number 3 is mapped to a logical number 6. Thus, 'Recv from 0' is converted to 'Recv from 7', and 'Send to 6' is converted to 'Send to 3'.

Thus, 'Recv from 7' and 'Send to 3' are sequentially stored in the issue queue 142-5 of the processing node 5 P5.

If a command message regarding broadcast functions is processed at the other processing nodes in the same manner, point-to-point functions with respect to broadcast functions are stored in issue queues of the processing nodes P0 to P7.

An operation of processing a command message regarding scatter functions, by using the collective communication system of FIG. 1, will be described with reference to FIGS. 14A and 14B.

Figure 14A:
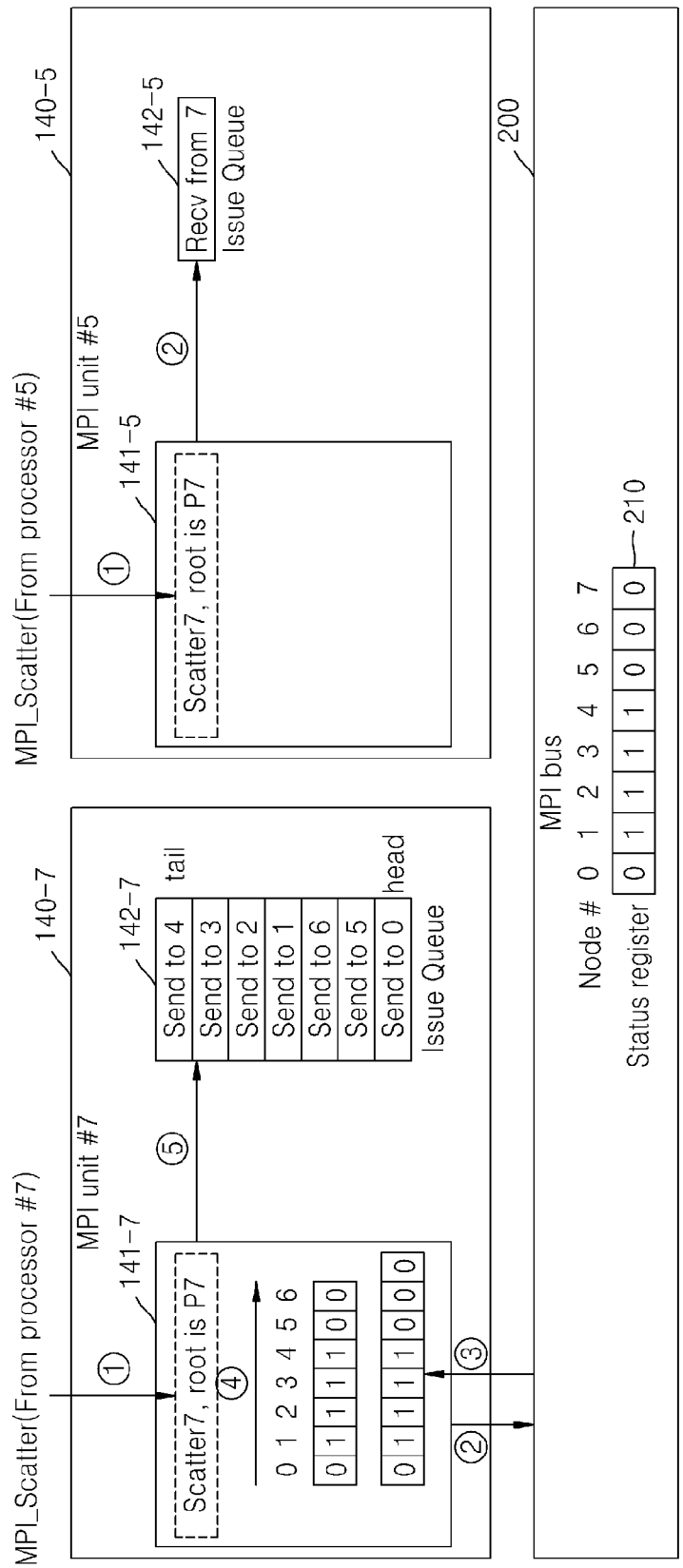
FIG. 14A illustrates an operation of processing a command message regarding scatter functions by using the collective communication system illustrated in FIG. 1.

FIG. 14A illustrates an operation of processing a command message regarding scatter functions at a root processing node 7 P7 and a processing node 5 P5, among a plurality of processing nodes P0 to P7, by using the collective communication system illustrated in FIG. 1.

If the MPI unit 140-7 at the root processing node 7 P7 receives a command message MPI_Scatter regarding scatter functions from a processor of the processing node 7 (①), the MPU 141-7 at the root processing node 7 P7 requests the MPI bus 200 of status information of the processing nodes (②).

If the MPI unit 140-5 at a processing node 5 among the processing nodes expect for the root processing node 7 P7 receives the command message MPI_Scatter regarding scatter functions from a processor of the processing node 5 (①), the MPI unit 140-5 stores a point-to-point function 'Recv from 7' that receives data from the root processing node 7 P7 in an issue queue 142-5 (②). 'Recv from 7' is stored in an issue queue of each of the processing nodes except for the root processing node 7 P7, similar to the case of the processing node 5.

Next, the MPI bus 200 reads the status information stored in the status register 210 and transmits the read status information to the root processing node 7 P7 according to a request of the root processing node 7 P7 (③). The status register 210 may store the status information by allocating one bit to each processing node. For example, in FIG. 13, a processing node having a 'busy' status is marked by '1', and a processing node having a 'free' status is marked by '0'.

The MPU 141-7 at the root processing node 7 P7 determines a transmission order between processing nodes so as to transmit data first to processing nodes that have a 'free' status, based on the status information received from the MPI bus 200 (④). For example, an initially-set transmission order is the order of processing node numbers 0, 1, 2, 3, 4, 5, and 6. If transmission priorities of the initially-set transmission order are given to the numbers 0, 5, and 6 of the processing nodes that have a 'free' status, the transmission order may be determined in the order of processing node numbers 0, 5, 6, 1, 2, 3, and 4.

The MPU 141-7 at the root processing node 7 P7 stores point-to-point functions MPI_Send corresponding to a scatter command message according to the transmission order between the processing nodes determined to transmit data first to the processing nodes that have a 'free' status, in the issue queue 142-7 (⑤). Thus, 'Send to 0', 'Send to 5', 'Send to 6', 'Send to 1', 'Send to 2', 'Send to 3', and 'Send to 4' are sequentially stored in the issue queue 142-7 of the root processing node 7 P7.

Figure 14B:
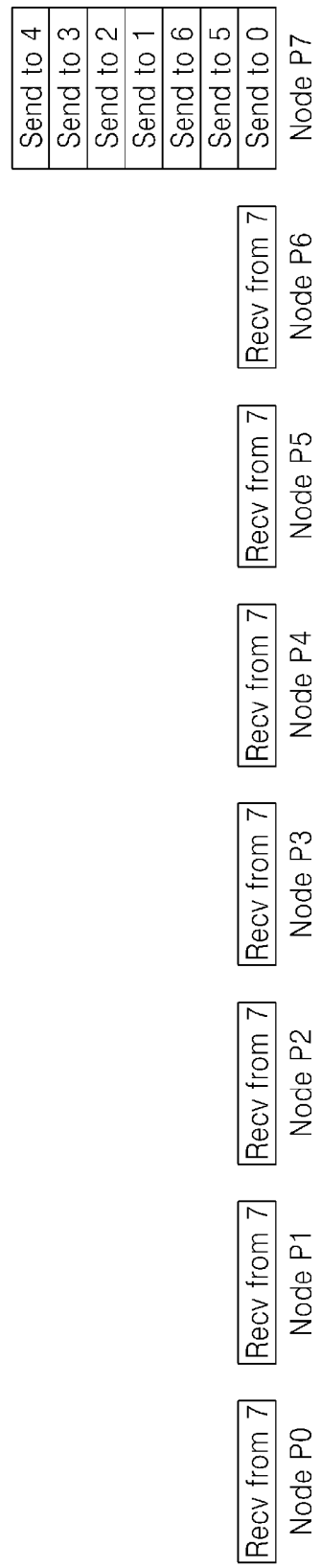
FIG. 14B illustrates point-to-point functions stored in an issue queue of processing nodes after the command message regarding scatter functions is processed by using the collective communication system illustrated in FIG. 1.

By processing the command message regarding scatter functions, as described above, the point-to-point functions regarding broadcast functions illustrated in FIG. 14B are stored in an issue queue of each of the processing nodes P0 to P7.

An operation of processing a command message, regarding gather functions by using the collective communication system of FIG. 1, will be described with reference to FIGS. 15A and 15B.

Figure 15A:
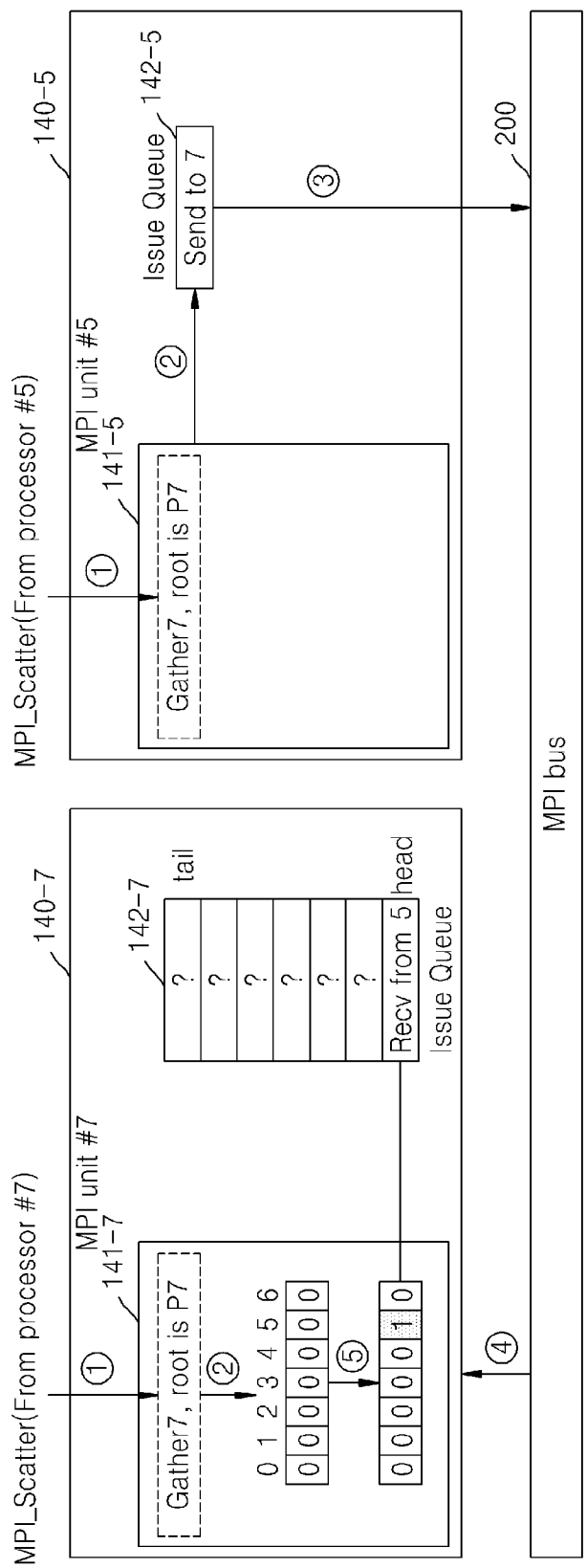
FIG. 15A illustrates an operation of processing a command message regarding gather functions by using the collective communication system illustrated in FIG. 1.

FIG. 15A illustrates an operation of processing a command message regarding gather functions at the root processing node 7 P7 and the processing node 5 P5, among the plurality of processing nodes P0 to P7, by using the collective communication system illustrated in FIG. 1.

If the MPI unit 140-7 at the root processing node 7 P7 receives a command message MPI_Gather regarding gather functions from a processor of the processing node 7 (①), the MPU 141-7 of the root processing node 7 P7 resets a mask register Mask reg (②).

Also, if the MPI unit 140-5 at the processing node 5 P5, among processing nodes except for the root processing node 7 P7, receives the command message MPI_Gather regarding gather functions from the processor of the processing node 5 (①), the MPI unit 140-5 stores a point-to-point function 'Send to 7' that transmits data to the root processing node 7 P7 in the issue queue 142-5 (②). 'Send to 7' is stored in an issue queue of each processing node, similar to the case of the processing node 5, among the processing nodes except for the root processing node 7 P7.

If the processing node 5 P5 among the processing nodes first transmits information that requests communication according to the point-to-point function 'Send to 7' to the MPI bus 200 (③), the MPI bus 200 transmits information that requests communication according to the point-to-point function 'Send to 7' received from the processing node 5 P5 to the root processing node 7 P7 (④).

If the MPI unit 140-5 of the root processing node 7 receives a data transmission request from the processing node 5 P5, the MPI unit 140-5 of the root processing node 7 masking processes bits regarding the processing node 5 of the mask register Mask reg and then stores a point-to-point function 'Recv from 5' that receives data from the processing node 5 P5, in an issue queue 142-7 (⑤).

Thus, point-to-point functions corresponding to processing nodes that request data transmission are stored in the issue queue 142-7 of the root processing node 7 P7 in the order of the processing nodes.

Figure 15B:
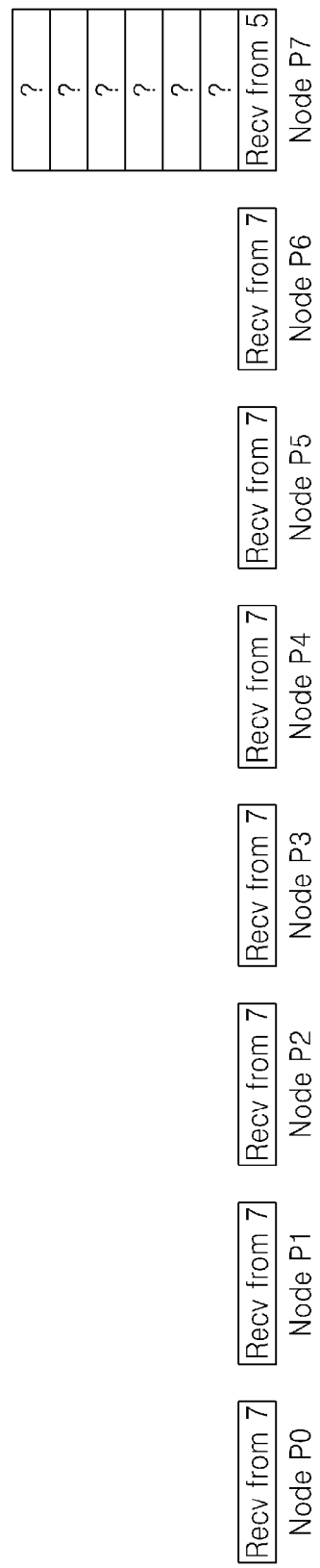
FIG. 15B illustrates point-to-point functions stored in an issue queue of processing nodes after the command message regarding gather functions is processed by using the collective communication system illustrated in FIG. 1.

By processing the command message regarding gather functions, as described above, point-to-point functions with respect to broadcast functions are stored in an issue queue of each of the processing nodes P0 to P7, as illustrated in FIG. 15B.

FIG. 16 illustrates a pseudo code regarding a broadcast function processing algorithm. FIG. 17 illustrates a pseudo code regarding a scatter function processing algorithm. FIG. 18 illustrates a pseudo code regarding a gather function processing algorithm.

Figure 19:
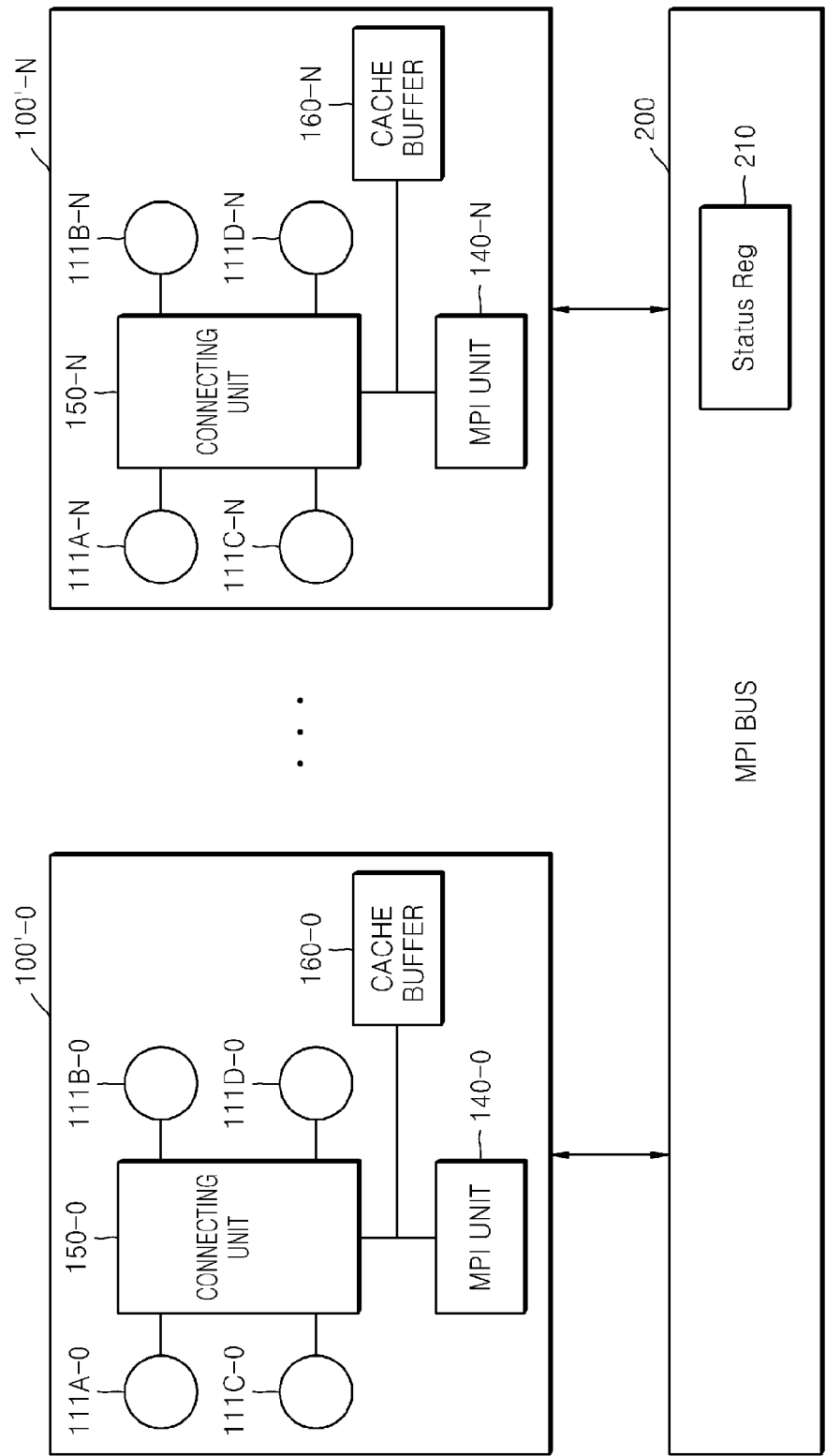
FIG. 19 is a block diagram schematically illustrating a collective communication system according to another embodiment.

FIG. 19 is a block diagram schematically illustrating a collective communication system according to another embodiment.

As illustrated in FIG. 19, the collective communication system according to the present embodiment includes a plurality of processing nodes 100'-0 to 100'-N and an MPI bus 200. Here, N is a natural number that is equal to or greater than 2.

Each of the plurality of processing nodes 100'-0 to 100'-N may include a multi-processing unit. The multi-processing unit may include two or more processing units. FIG. 19 illustrates a structure of the multi-processing unit, including four processing units. The multi-processing unit may also be referred to as a multi-core processor.

The processing node 0 100'-0 includes four processing units 111A-0, 111B-0, 111C-0, and 111D-0, a connecting unit 150-0, a cache buffer 160-0, and an MPI unit 140-0.

Each of four processing units 111A-0, 111B-0, 111C-0, and 111D-0 includes a processor 110-0, an IM 120-0, and a DM 130-0. Here, the processor 110-0, the IM 120-0, and the DM 130-0 have already been described in FIG. 1. Thus, redundant descriptions will be omitted.

The connecting unit 150-0 may connect four processing units 111A-0, 111B-0, 111C-0, and 111D-0 selectively, according to an initially-set rule. Also, the connecting unit 150-0 may connect one among four processing units 111A-0, 111B-0, 111C-0, and 111D-0 to the MPI unit 140-0, according to the initially-set rule.

The cache buffer 160-0 stores data transmitted via the MPI bus 200, temporarily. Data stored in the cache buffer 160 may be transmitted to one among four processing units 111A-0, 111B-0, 111C-0, and 111D-0 via the connecting unit 150-0.

The MPI unit 140-0, having the same structure as that of the MPI unit 140-0 illustrated in FIG. 1, has already been described in FIG. 1. Thus, redundant descriptions will be omitted. Since the MPI bus 200 has already been described in FIG. 1, redundant descriptions will be omitted.

The other processing nodes 100'-1 to 100'-N have the same structure as that of the processing node 0 100'-0.

Figure 20:
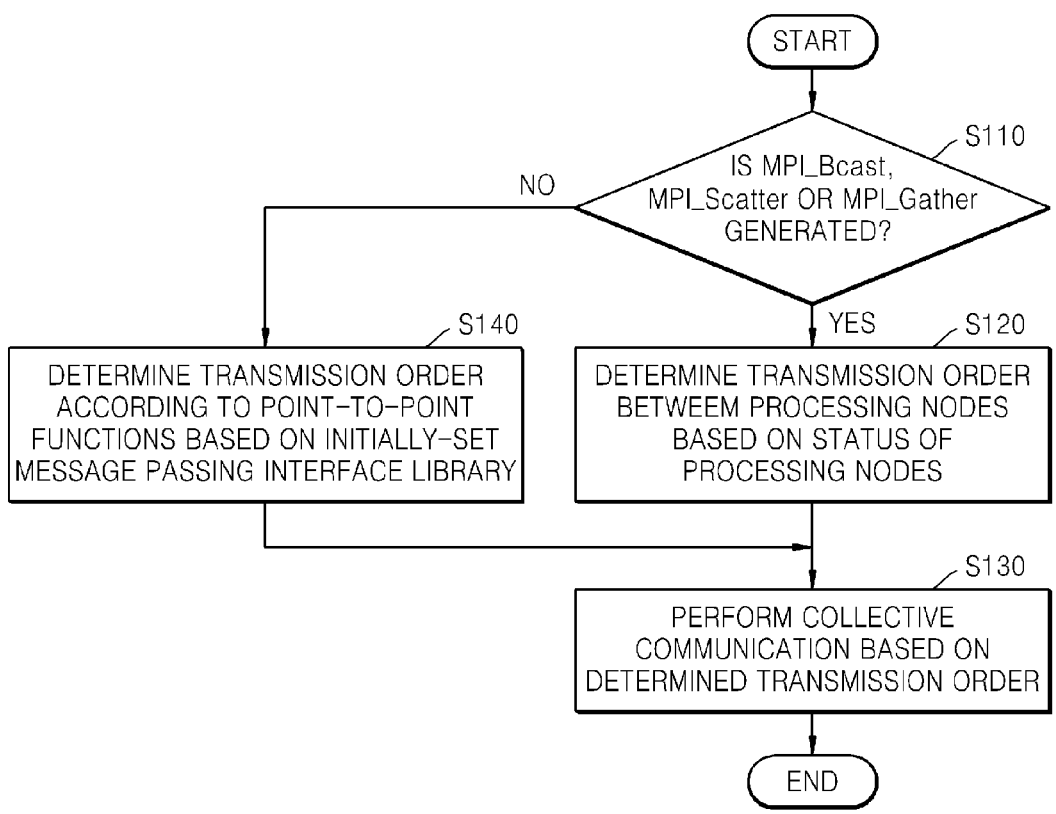
FIG. 20 is a flowchart illustrating a method of performing collective communication according to an embodiment.

A method of performing collective communication, according to an embodiment, by using the collective communication system illustrated in FIG. 1 or 19 will be described with reference to FIG. 20.

An MPI unit of each of the processing nodes of the collective communication system determines whether a command message regarding one among broadcast, scatter, and gather functions is generated by a processor (S110). In other words, it is determined whether one among MPI_Bcast, MPI_Scatter, and MPI_Gather is generated by the processor.

If it is determined, as a result of the determining in operation S110, that the command message regarding one among broadcast, scatter, and gather functions is generated by the processor, the collective communication system determines a transmission order regarding processing nodes by giving transmission priorities to processing nodes that do not communicate, based on a status of each processing node (S120). For example, the status of each processing node is checked by applying an algorithm corresponding to the generated command message, and transmission priorities of point-to-point communication are given to processing nodes that have a "free" status, thereby determining the transmission order between collective communication functions.

The collective communication system performs point-to-point communication regarding collective communication functions based on the transmission order determined in operation S120 (S130).

If it is determined, as a result of the determining in operation S110, that a command message regarding collective communication functions, except for broadcast, scatter, and gather functions, is generated, the collective communication system determines a transmission order according to point-to-point functions that are converted based on an initially-set MPI library (S140).

Figure 21:
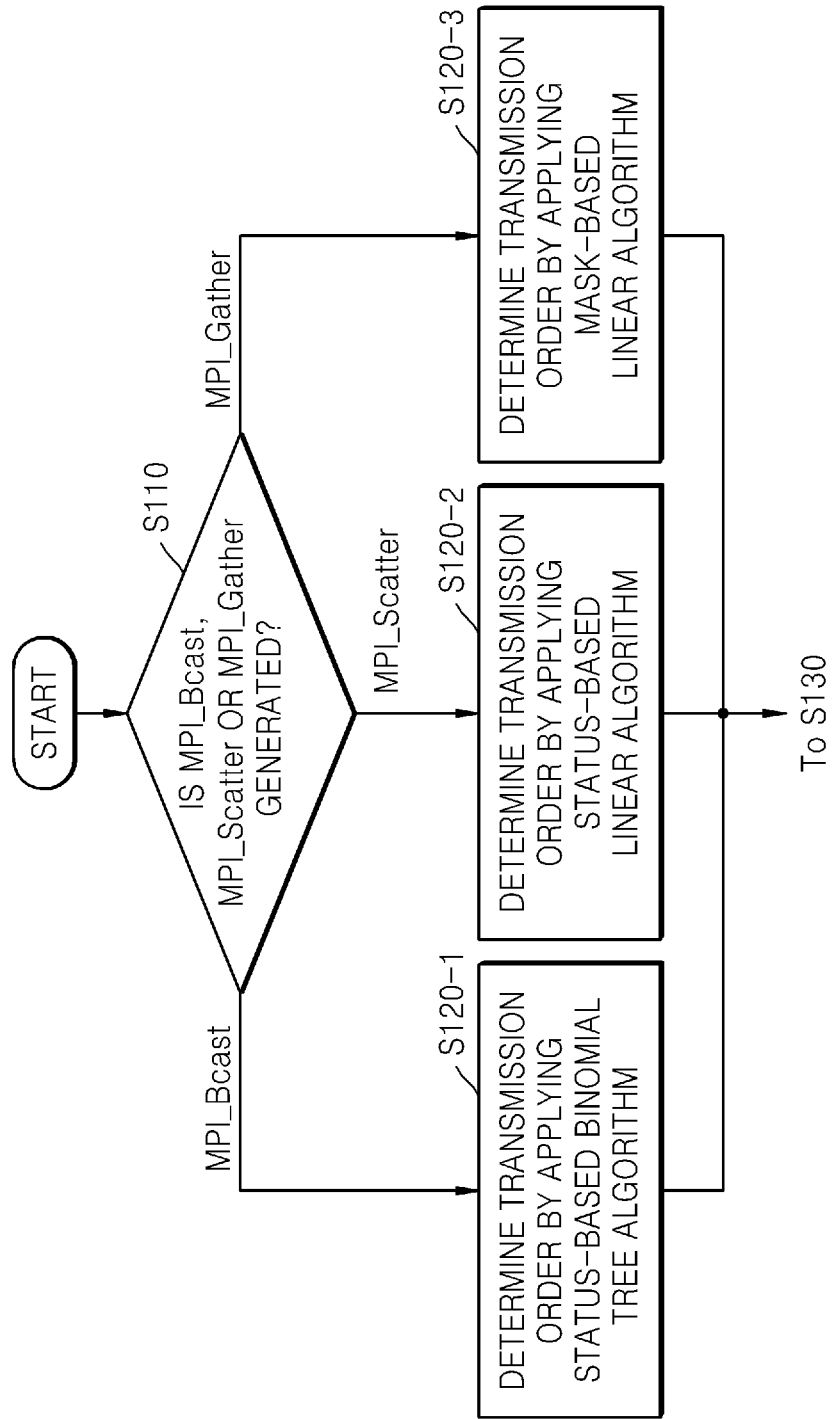
FIG. 21 is a detailed flowchart illustrating an operation of determining a transmission order regarding processing nodes by giving transmission priorities to processing nodes that do not communicate, based on a status of each processing node illustrated in FIG. 20.

Operation S120 in FIG. 20 will be described in detail with reference to FIG. 21. FIG. 21 is a detailed flowchart illustrating operation S120 in FIG. 20.

If it is determined, as a result of the determining in operation S110, that a command message MPI_Bcast regarding broadcast functions is generated, the collective communication system determines a transmission order between processing nodes by applying a status-based binominal tree algorithm (S120-1). For example, according to the status-based binomial tree algorithm, the transmission order may be determined by changing processing nodes of an initially-set binomial tree, which hold high communication ranks and are in communication, to processing nodes that do not communicate based on the status of each processing node.

If it is determined, as a result of determining in operation S110, that a command message MPI_Scatter regarding scatter functions is generated, the collective communication system determines a transmission order between processing nodes by applying a status-based linear algorithm (S120-2). For example, according to the status-based linear algorithm, a linear execution order of point-to-point functions corresponding to the generated command message may be determined so as to transmit data first to the processing nodes that do not communicate, from a root processing node based on the status of each processing node.

If it is determined, as a result of determining in operation S110, that a command message MPI_Gather regarding gather functions is generated, the collective communication system determines a transmission order between processing nodes by applying a mask-based linear algorithm (S120-3). For example, according to the mask-based linear algorithm, the transmission order may be determined by giving a transmission order to the processing nodes so as to transmit data first to a root processing node from processing nodes that request data transmission and by writing masking information regarding the processing nodes to which the transmission order is given.

Figure 22:
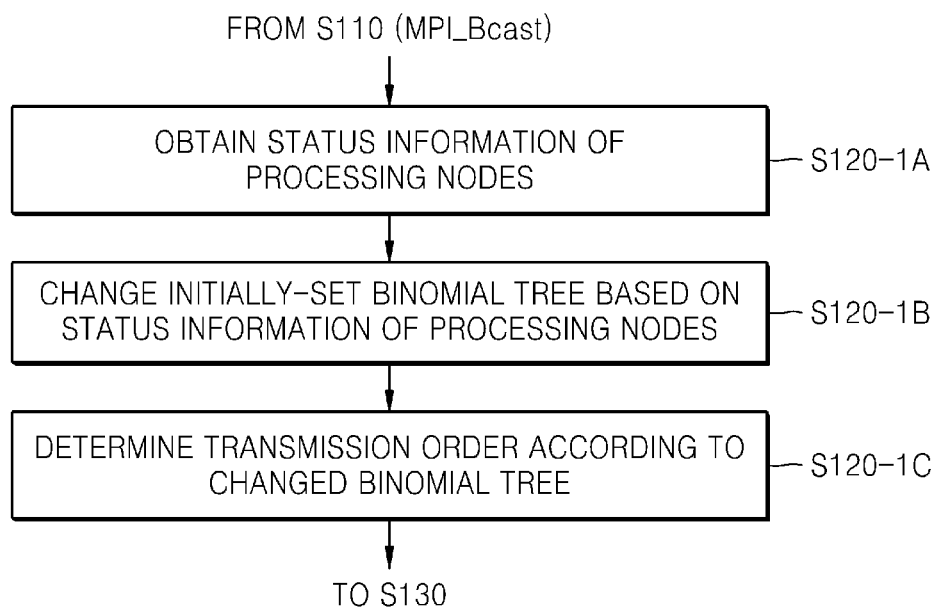
FIG. 22 is a detailed flowchart illustrating an operation of determining a transmission order by applying a status-based binomial tree algorithm illustrated in FIG. 21.

Operation S120-1 in FIG. 21 will be described in detail with reference to FIG. 22. FIG. 22 is a detailed flowchart illustrating operation S120-1 in FIG. 21.

An MPI unit of the collective communication system obtains status information of the processing nodes (S120-1A). For example, the status information of the processing nodes may be stored in a status register included in an MPI bus. The MPI unit may request the MPI bus of the status information and may receive the status information read from the status register to the MPI bus, according to a status information request.

Next, the MPI unit changes processing nodes of an initially-set binomial tree, which hold high communication ranks and are in communication, to processing nodes that do not communicate, based on the obtained status information (S120-1B). For example, a mapping table may be generated, in which information regarding processing nodes that hold high communication ranks and that are in communication is converted to information regarding processing nodes that hold low communication ranks and that do not communicate, in a transmission order according to the initially-set binomial tree based on the status information read from the status register. By using the generated mapping table, information regarding processing nodes that hold high communication ranks and that are in communication may be converted to information regarding processing nodes that hold low communication ranks and that do not communicate, in a transmission order according to the initially-set binomial tree. For example, the transmission order according to the initially-set binomial tree algorithm illustrated in FIG. 4A may be modified to the transmission order according to the status-based binomial tree illustrated in FIG. 4B.

Next, the MPI unit determines an execution order of point-to-point functions corresponding to a command message, regarding broadcast functions according to the changed binomial tree (S120-1C). For example, an execution order of point-to-point functions, corresponding to a command message regarding broadcast functions according to the status-based binomial tree of FIG. 11B modified from FIG. 11A, may be determined.

Figure 23:
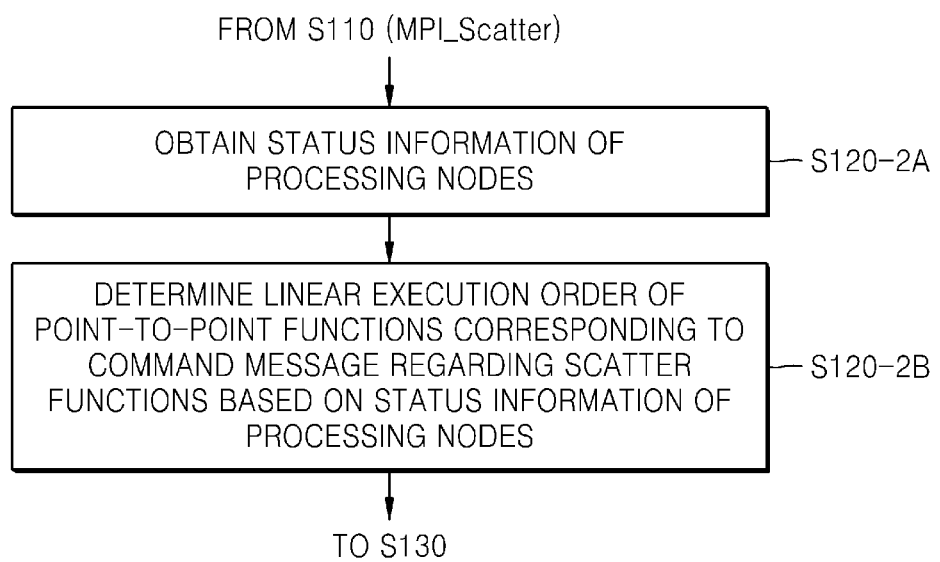
FIG. 23 is a detailed flowchart illustrating an operation of determining a transmission order between processing nodes by applying a status-based linear algorithm illustrated in FIG. 21.

Operation S120-2 in FIG. 21 will be described in detail with reference to FIG. 23. FIG. 23 is a detailed flowchart illustrating operation S120-2 in FIG. 21.

An MPI unit, of the collective communication system, obtains status information of processing nodes (S120-2A). For example, the MPI unit may receive the status information of processing nodes that are read from a status register included in an MPI bus.

The MPI unit determines a linear execution order of point-to-point functions, corresponding to the command message regarding scatter functions to transmit data first to processing nodes that have a 'free' status, from a root processing node based on the obtained status information (S120-2B). For example, the transmission order illustrated in FIG. 5A, that is set according to the initially-set linear algorithm, may be modified to the transmission order illustrated in FIG. 5B, according to the status-based linear algorithm.

Figure 24:
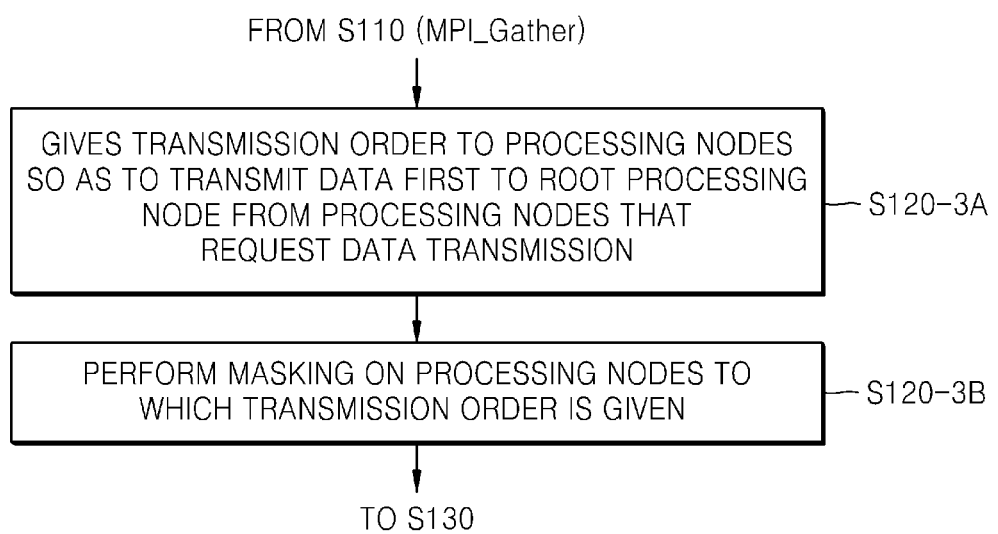
FIG. 24 is a detailed flowchart illustrating an operation of determining a transmission order between processing nodes by applying a mask-based linear algorithm illustrated in FIG. 21.

Operation S120-3 in FIG. 21 will be described in detail with reference to FIG. 24. FIG. 24 is a detailed flowchart illustrating operation S120-3 in FIG. 21.

An MPI unit of the collective communication system gives a transmission order to processing nodes to transmit data first to a root processing node from processing nodes that request data transmission (S120-3A). Transmission priorities of the transmission order may be given to processing nodes that request data transmission, among processing nodes that have a 'free' status, based on a status of each processing node. For example, the transmission order illustrated in FIG. 6A according to the initially-set linear algorithm, may be modified to the transmission order illustrated in FIG. 6B according to the mask-based linear algorithm.

Then, the MPI unit performs masking on the processing nodes to which the transmission order is given (S120-3B). For example, masking may be performed by writing masking information '1' to the processing nodes to which the transmission order are given, by using the mask register that is reset to '0'.

While aspects of exemplary embodiments have been particularly shown and described, it will be understood that various changes in form and details may be made therein without departing from the spirit and scope of the following claims.

What is claimed is:

1. A method of performing collective communication in a collective communication system comprising processing nodes, the method comprising:
  determining whether a command message, regarding one function among a broadcast function, a scatter function, and a gather function, is generated by a processor;
  determining a transmission order between the processing nodes by assigning higher transmission orders to processing nodes that are not currently in communication and assigning lower transmission orders to processing nodes that are currently in communication, based on a status of each of the processing nodes if it is determined that the command message regarding the one function among the broadcast function, the scatter function, and the gather function, is generated by the processor; and
  performing communication with respect to the command message based on the determined transmission order.

2. The method of claim 1, wherein, if the command message is generated regarding the broadcast function, the determining of the transmission order comprises determining the transmission order according to a status-based binomial tree algorithm.

3. The method of claim 1, wherein, if the command message is generated regarding the scatter function, the determining of the transmission order comprises determining the transmission order according to a status-based linear algorithm, and according to the status-based linear algorithm, a linear execution order of the point-to-point function corresponding to the generated command message is determined, such that data is first transmitted to processing nodes that are not currently in communication, from a root processing node based on the status of each processing node.

4. The method of claim 1, wherein, if the command message is generated regarding the gather function, the determining of the transmission order comprises determining the transmission order according to a mask-based linear algorithm, and according to the mask-based linear algorithm, the transmission order is determined by giving the transmission order to the processing nodes, such that data is first transmitted to a root processing node from processing nodes that request data transmission, and masking information is written regarding the processing nodes to which the transmission order is given.

5. The method of claim 1, further comprising, if it is determined that the command message is generated regarding collective communication functions except for the broadcast function, the scatter function, and the gather function, determining the transmission order according to a point-to-point function that are converted based on an initially-set MPI library.

6. The method of claim 2, wherein the status-based binomial tree algorithm comprises:
 obtaining status information of the processing nodes;
 changing processing nodes that are located at high-ranking stages of an initially-set binomial tree and that are in communication, to processing nodes that are not currently in communication, based on the obtained status information; and
 determining an execution order of a point-to-point function corresponding to the command message regarding the broadcast function according to the changed processing nodes.

7. The method of claim 6, wherein the status information of the processing nodes is obtained from a status register included in a message passing interface (MPI) bus.

8. A collective communication system comprising:
 a message passing interface (MPI) bus comprising a status register which stores status information of processing nodes and selectively forms a transmission path between the processing nodes according to a transmission order; and
 a MPI unit, which if a command message regarding one function among the broadcast function, the scatter function, and the gather function is received, determines the transmission order between the processing nodes by assigning higher transmission orders to processing nodes that are not currently in communication and assigning lower transmission orders to processing nodes that are currently in communication, based on the status information read from the status register.

9. The collective communication system of claim 8, wherein the MPI bus forms the transmission path having a crossbar structure.

10. The collective communication system of claim 8, wherein the MPI unit comprises:
 a message processing unit (MPU), which if the command message corresponding to one function among the broadcast function or the scatter function is received, determines an execution order of the point-to-point function corresponding to the received command message by assigning the higher transmission orders to the processing nodes that are not currently in communication, based on the status information read from the status register; and
 an issue queue which sequentially stores the point-to-point function according to the determined execution order.

11. The collective communication system of claim 8, further comprising a processor which processes functions relating to collective communication, wherein the processor, which if the command message is received regarding collective communication functions except for the broadcast function, the scatter function, and the gather function, converts the collective communication functions except for the broadcast function, the scatter function, and the gather function to the point-to-point function according to an initially-set algorithm, and if the one function among the broadcast function, the scatter function, and the gather function is received, the processor transmits the command message regarding the received function to the MPI unit.

12. The collective communication system of claim 10, wherein the MPI unit further comprises a memory device which stores information regarding the transmission order according to an initially-set binomial tree, and
 if the command message is received corresponding to the broadcast function, the MPU generates a mapping table, in which information regarding processing nodes that hold high communication ranks and that are in communication is converted to information regarding processing nodes that hold low communication ranks and that are not currently in communication, in the transmission order according to the initially-set binomial tree based on the status information read from the status register, and the MPU determines the transmission order based on the mapping table.

13. The collective communication system of claim 10, wherein, if the command message is received corresponding to the scatter function, the MPU determines a linear execution order of the point-to-point function corresponding to the received command message, such that data is first transmitted to the processing nodes that are not currently in communication, from a root processing node based on the status information of each processing node.

14. The collective communication system of claim 10, wherein the MPU further comprises a mask register which stores masking information, and if the command message is received corresponding to the gather function, the MPU gives the transmission order to the processing nodes, such that data is first transmitted to a root processing node from processing nodes that request data transmission, and writes the masking information to the mask register regarding the processing nodes to which the transmission order is given.

15. The collective communication system of claim 11, wherein the processor comprises a multi-core processor.

16. A method of performing collective communication in a collective communication system comprising processing nodes, the method comprising:
 determining whether a command message, generated by a processor, corresponds with at least one of a broadcast function, a scatter function, and a gather function;
 applying a binomial tree algorithm to determine a transmission order between the processing nodes based on a status of each of the processing nodes, the status indicating whether each of the processing nodes is currently in communication, if the command message corresponds with the broadcast function;
 applying a linear algorithm to determine the transmission order between the processing nodes based on the status of each of the processing nodes, if the command message corresponds with the scatter function;
 applying a mask-based linear algorithm to determine the transmission order between the processing nodes based on the status of each of the processing nodes, if the command message corresponds with the gather function; and performing the collective communication based on the determined transmission order.

17. The method of claim 16, further comprising, if it is determined that the command message does not correspond with the at least one of the broadcast function, the scatter function, and the gather function, determining the transmission order according to a point-to-point function that is converted based on an initially-set message passing interface (MPI) library.

18. The method of claim 16, wherein the processor comprises a multi-core processor.

* * * * *